United States Patent

Morikawa et al.

[11] Patent Number: 5,194,946
[45] Date of Patent: Mar. 16, 1993

[54] COLOR SCANNER AND AUTOMATIC SETTING METHOD OF SIGNAL PROCESSING CONDITIONS

[75] Inventors: Seiichiro Morikawa; Fumito Takemoto, both of Kaisei, Japan

[73] Assignee: Fuji Photo Film Co., Ltd., Kanagawa, Japan

[21] Appl. No.: 421,436

[22] Filed: Oct. 13, 1989

[30] Foreign Application Priority Data

| Oct. 13, 1988 | [JP] | Japan | 63-258227 |
| Oct. 13, 1988 | [JP] | Japan | 63-258228 |
| Dec. 22, 1988 | [JP] | Japan | 63-324424 |
| Dec. 28, 1988 | [JP] | Japan | 63-333836 |

[51] Int. Cl.$^5$ .............................. H04N 1/46
[52] U.S. Cl. ..................... 358/75; 358/406; 358/448
[58] Field of Search ............ 358/75, 77, 78, 80, 358/400, 401, 450, 406, 443, 448

[56] References Cited

U.S. PATENT DOCUMENTS

| 4,792,847 | 12/1988 | Shimazaki et al. | 358/75 |
| 4,864,490 | 9/1989 | Nomoto et al. | 364/157 |
| 4,992,863 | 2/1991 | Moriya | 358/75 |

Primary Examiner—Edward L. Coles, Sr.
Assistant Examiner—Thomas D. Lee
Attorney, Agent, or Firm—Sughrue, Mion, Zinn, Macpeak & Seas

[57] ABSTRACT

This invention is a color scanner comprising an image reading means for reading an original stored in an original cassette by carrying out of a rough-scanning or main scanning, a signal processing means for signal-processing the main scan data of said original, which the main scan data obtained by said image reading means, a calculation setting means for obtaining characteristic values of said original on the basis of rough-scan data obtained by said rough-scanning, calculating original classification informations on the basis of the characteristic values, setting a signal processing conditions into said signal processing means, and outputting a certainty factor, an input means for inputting supplemental informations necessary when said certainty factor is low, and a recording means for recording the image on the basis of the output of the signal processing means. This invention relates to a method thereof. This invention is a color scanner comprising an input section for scanning and reading an original while conducting color separation, an original storage and transporting section having an original storage portion, said original storing and transporting section being capable of automatically transporting said original from said storage portion to said input section, image processing section for performing image processing on the basis of color separation signals from said input section so as to produce halftone signals, an output section for producing and outputting a halftone film from said halftone signals, and automatic condition setting section for determining processing conditions on the basis of the rough-scan data from said image processing section and for setting set-up parameters of said image processing section.

12 Claims, 23 Drawing Sheets ns, the stored color original
image information is displayed on the color CRT according to the inputted image information, the displaying image is editted in a main memory device of a computer through an interactive input system and then the resultant is again stored in a magnetic disc or the like with a format corresponding to the outputted display. Next, the color image information corresponding to the display or scene editted and outputted is D/A-converted and inputted to the output control circuit of a color scanner in order to obtain the desired laid out image. The layout retouch system above necessitates disadvantageously a memory medium of much capacity for storing the information of the color original image and a high speed computer for editting or processing the information, resulting in a cost rising of the whole construction of the system and a time increase for editting or processing the information.

COLOR SCANNER AND AUTOMATIC SETTING METHOD OF SIGNAL PROCESSING CONDITIONS

BACKGROUND OF THE INVENTION

1. Field of the Invention

This invention relates to a color scanner and an automatic setting method of a signal processing conditions, in particular, to the method for automatically or manually setting the signal processing conditions and the color scanner provided with an automatic setting function or by an input means, which signal processing conditions being in the color scanner of a flat bed type. The color scanner is adapted to manufacture separations of C (cyan), M (magenta), Y (yellow) and K (black) colors by halftoning them after the color original is line scanned, color-separated, magnified by the predetermined times, the color separation signals are suitably processed by color correction, sharpness emphasis, gradation conversion and so on. Further, this invention relates to a color scanner capable of performing full-automatic operation from reading of an original till output of an image.

2. Description of the Prior Art

According to one of the conventional method for manufacturing each color separation plate of a plurality of original color images, each original image is halftoned by the predetermined times by means of an image input/output system so as to produce a color separation film, a mask plate produced in a different process and the halftoned color separation film are laid out on and adhered to layout sheet, and the layout sheet is adherently exposed to light. However, the conventional method for manufacturing color separation has disadvantages, such as many processing steps, a necessity of skilled craftmen for precisely positioning and adhering the color separation at the predetermined places of the layout sheet, much time, much laborous and skillful work, and much material.

There is another conventional method for reproducing the color image, in which method a plurality of original color images respectively are printed in color by the predetermined times, the reproduced original images are cut out in the predetermined shape of an image on the predetermined block copy, the cut out images are laid out and adhered on the predetermined positions of the block copy board. However, because the conventional method has used a photographic technique, it is not possible to freely change a color correction processing, a sharpness emphasis, and a gradation conversion, resulting in poor image quality. In addition, there has been an apparatus output-layouting simultaneously square images through a plurality of input apparatus (refer to, for example, Japanese Patent Publication No. 31762/1977). According to the conventional apparatus for outputting square image. It is difficult to correspond to all or any shapes of the image, is necessary of laborous works for producing the mask plate and of a plurality of input scanning section used to input the color original.

Recently, a layout retouch system which is so called as a total system for plate making process of the printing industry has been proposed, in which system the images are inputted through a digitizer in order to display images and patterns on a color CRT. The color original image is color-scanned with a designated magnification and the scanned image is stored in a memory device after A/D-converting. Then, the stored color original Another conventional system for inputting and outputting the image, which has been improved to solve the shortcomings mentioned above, is shown in FIG. 1 and described in Japanese Patent Laid-open No. 11062/1984. According to the conventional system shown in FIG. 1, a color original 2 applied on a rotary input drum 1 is outputted as an image on a recording material, for example, a color paper 11 pasted on an output drum 10, which rotating according to the image information inputted through a digitizer 14 of an image input apparatus. In the image input/output system above, the color original 2 is color-scanned by a reading head 21 in order to color separate and the color separation signal CS obtained is inputted to a logarithmic converting circuit 3. The color separation signal CS is converted to density signals DN through the logarithmic converting circuit 3 and then it is converted to digital density signal DS by an A/D converter 4. The digital density signal DS is inputted to a signal processing section 5 and a microprocessor 12. In the signal processing section 5, a color correction processing, a sharpness emphasis, and a gradation conversion are carried out, the color-processed image information DSA is converted to analog signals through a D/A converter 6 and inputted to a modulator 8 installed in a laser beam printer in order to modulate a laser beam emitted from a laser oscillator 7 and expose the color paper 11 pasted on the output drum 10 by means of an output head (not shown).

While, it is necessary to install in the system a console 16 provided with a keyboard through which data and commands are inputted. According to the conventional system, the data and the commands or instruction inputted through the console 16 are inputted to the computer 13 for processing these data and commands outputting information and the information is displayed on an interactive graphic display 15. The computer 13 is connected to a microprocessor 12 of a lower-level system, the microprocessor 12 receives the density signal DS outputted from the A/D converter 4 and further connected to the signal processing section 5 in order to function the process. The computer 13 and the microprocessor 12 constructs a computer system and the system displays the instruction for the operator and the like on the graphic display 15 according to the instored programs. The positions of the input drum 1 and the output drum 10 are respectively detected by detectors (now shown) and the positional informations are inputted into the motion control section 9. The microprocessor 12 is adapted to be connected to the motion control section 5 so as to relatively drive and control the positional relationship of the input drum 1 and the output drum 10. The digitizer 14 has an original coordinate and X-Y axes of its own, and the origin coordinate can be easily moved to any points and the X-Y axes can easily rotate by processing the signal. The corresponding relationship between the image position on the input drum 1 and the digitizer 14 is determined by installing guides, such as pins at the common plural position. The digitizer 14 is connected to the computer 13 to which the shape of the images and desired positional coordinates are inputted.

In the image input/output system shown in FIG. 1, it is noted that the color original 2 is pasted directly to the smooth outer face of the cylindrical input drum 1 as shown in FIG. 2, which drum being made of acrylic resins, glass or the like. The input drum 1 has a light source 20 therein and the light source illuminates the color original 2 and the light beam LT passes through the cylindrical wall of the input drum 1. The reading head 21 situated outside of the input drum 1 receives the passed light beam LT, so that the image of the color original 2 is inputted to the reading head 21. In the condition, if there is a space or gap of a length about wavelength of the beam of the light source 20 between the color original 2 and the input drum 1, a Newton ring (interference fringe) is formed by an interference phenomenon happened on the surface between the rear face of the color original 2 and the front face of the input drum 1, so that the Newton ring is appeared on the color original 2 in the shape of stripes or density irregularity, deteriorating the quality of the original considerably.

According to the conventional method, in order to prevent the interference stripes from forming, super fine particle powder has been scattered or applied between the color original 2 and the input drum 1 or filler agent is coated on the cylindrical drum 1. However, the fine particle powder has disadvantages, such as the outlines of particles are clearly seen when the multiplication of the image is high and the powder is troublesome to handle, and the filling agent has shortcomings, such as the application or coating and removing or wiping-out of the agent is very difficult to do them completely.

It is known that the image input/output system of the prior art receives an image information on the original film and the like, functions to enlarge or reduce the image, and outputs the image with an any layout on the display or some output device. The image input/output system must know or determine the coordinates of the color original 2 on the input drum 1 in order to layout the image during the reading of the original as shown in FIG. 2. Consequently, as shown in FIG. 3, the color original 2 is pasted on the original pasting base 22 of transparent and square-shaped sheet by pasting tapes 23. Positioning holes 24 formed in the original pasting base sheet 22 are fitted onto the corresponding pins of the digitizer so as to input the coordinates of the particular or necessary portion of the color original 2 to the image input/output system. Then, the positioning holes 24 of the original pasting base sheet 22 are fitted securely onto the corresponding pins 25 planted on the input drum 1 as shown in FIG. 4. As next step, the light source 20 in the interior of the input drum 1 as shown in FIG. 2 irradiates the color original 2 and the reading head 21 receives the passed light beam LT through the drum wall and the coloriginal 2, so that the image of the color original 2 is inputted to the reading heat 21. The inputted image is compared to the coordinates inputted by the digitizer so as to layout the image.

Furthermore, the conventional image input/output system necessitates expert operators determing and settling the separating conditions and signal processing conditions and the time used to the condition determination is considerably longer than that of the system for which time the system actually processes the separating operation and the signal processing. Then, operation of the conventional image input/output system for setting the parameter is complicated, so that psychological burden upon the operator is very heavy. For example, Japanese Patent Laid-open No. 37378/1985 specification describes an automatic setting system of a gradation conversion table of the image input/output system, which system determines directly solely the setting condition from the inputted character values. It is noted that any macro-sized information in the original fails to have a rule and accordingly the presumption precision of the parameter has a limit. Another example of Japanese Patent Laid-open No. 111570/1987 describes an automatic setting process of signal processing condition, an operation of the condition setting of which process depends on selective appointment of the basis of the subjective judgement of the operator for the automatic setting machine, so that the operation has shortcomings, such as uneffectiveness and non-correctness.

Generally, conventional color scanners are of drum scanner type in which an original to be read and outputted is pasted on an input drum by means of an pasting tapes or the like for enabling reading. More specifically, as shown in FIG. 5, the conventional color scanner has an input section 30 which scans and reads a color reversal film original so as to produce a color separation signal CS composed of color of red (R), green (G) and blue (B). The color separation signal CS is delivered to an image processing section 40A which produces a dot % signal DS and delivers it to an output section 50, whereby a halftone film compose of four color images of cyan (C), magenta (M), yellow (Y) and black (K) is obtained from the output section 50. The image processing section 40A is arranged such that an operator can externally and manually input a set-up condition SU which directly viewing the original or monitoring the image of the original displayed on a display device.

As stated above, the conventional color scanner is constructed such that the operator determines and inputs the set-up condition SU for each of the originals. The input is conducted by manipulating dials, keys or the like. In addition, the conventional color scanner of drum-scan type requires a troublesome work for setting the original on the cylinder or drum. In addition, replacement of the cylinder is necessary when the magnification has to be changed largely. Moreover, the setting of the original on the input section 30 also is conducted manually. Thus, the conventional color scanner was quite far from full-automation of the image forming process.

SUMMARY OF THE INVENTION

This invention has been invented under the situation above and an object of the invention is to provide a color scanner of a plane scanning (flat bed) type and an automatic setting method for the processing condition of the apparatus by automatically analyzing the original data and setting the image processing conditions without any troublesome operation and troublesome pasting of the original, in which apparatus the necessary supplemental information is inputted when the certainty factor is low.

Another object of this invention is to provide a flat bed type color scanner in which the image processing conditions are effectively set on the basis of analysis of the original.

Still another object of this invention is to provide a flat bed type color scanner in which a series of operations except for the setting of separating condition on the original, are fully automated so as to improve the efficiency of the scanning process, thereby overcoming the above-described problem of the prior art.

According to one aspect of this invention, for achieving the objects described above, there is provided a color scanner comprising an image reading means for reading an original stored in an original cassette by carrying out of a rough-scanning or main scanning, a signal processing means for signal-processing the main scanning data of said original, which the main scanning data obtained by said image reading means, an operating setting means for obtaining characteristic values of said original on the basis of rough-scanning data obtained by said rough-scanning, calculating original classification informations on the basis of the characteristic values, setting signal processing conditions for said signal processing means, and outputting a certainty factor, an input means for inputting necessary supplemental informations when said certainty factor is low, and a recording means for recording the image on the basis of the output of the signal processing means.

According to another aspect of this invention, there is provided an automatic setting method of signal processing conditions, in a color scanner for reading an original stored in an original cassette and signal-processing the signal obtained by the reading above in order to record the image, comprising the steps of obtaining characteristic values of said original on rough-scanning data of the original, calculating the original classification informations on the basis of the characteristics values, determining a certainty factor, automatically setting parameters of said signal processing on the basis of the original classification informations, and inputting necessary supplemental informations when the certainty factor is low.

Further, according to still another aspect of this invention, there is provided a color scanner comprising: an input section for scanning and reading an original while conducting color separation; an original storage and transporting section having an original storage portion, said original storing and transporting section being capable of automatically transporting said original from said storage portion to said input section; an image processing section for performing image processing on the basis of color separation signals from said input section so as to produce halftone signals; an output section for producing and outputting a halftone film from said halftone signals; and automatic condition setting section for determining signal processing conditions on the basis of rough-scan data from said image processing section and for setting set-up parameters of said image processing section.

The nature, principle and utility of the invention will become more apparent from the following detailed description when read in conjunction with the accompanying drawings.

DESCRIPTION OF THE PREFERRED EMBODIMENTS

Figure 6:
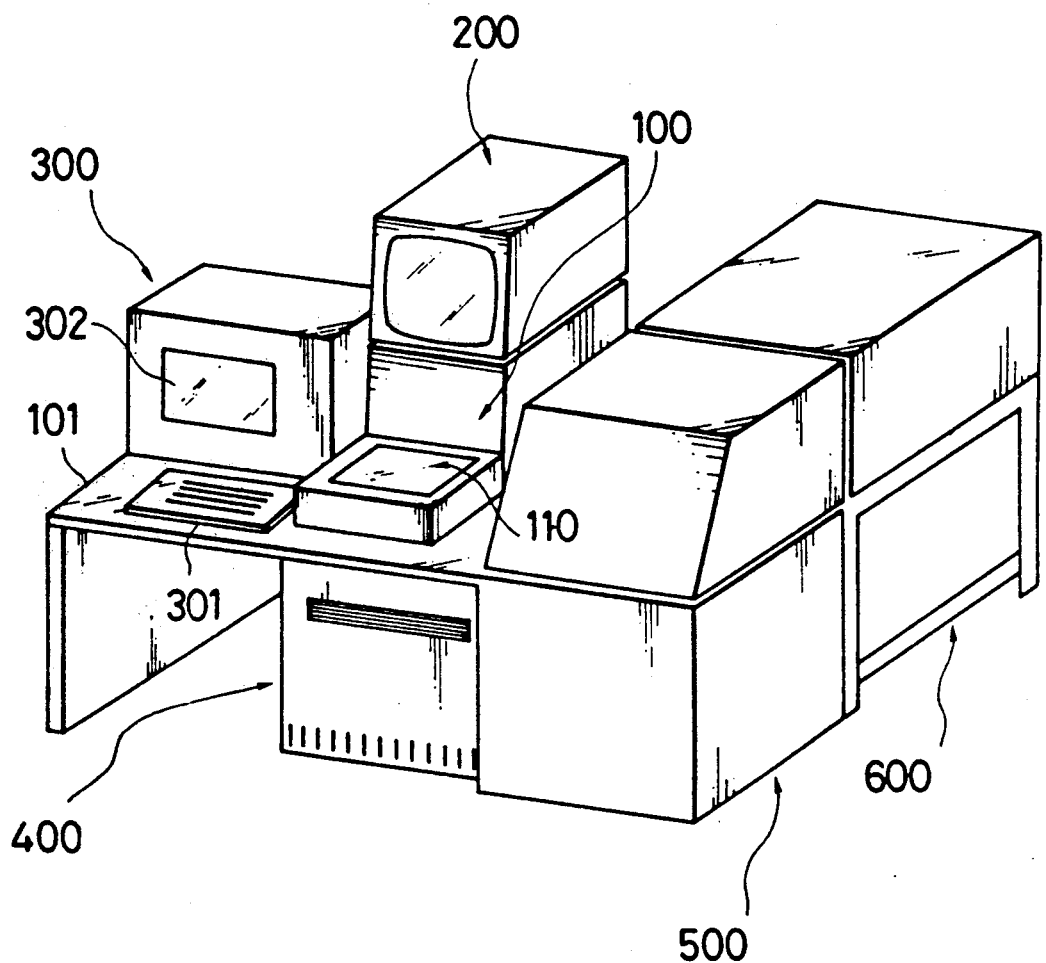
FIG. 6 is an appearance view of one of the embodiments of the color scanner according to this invention.

FIG. 6 shows an external appearance of the color scanner according to this invention. The system has a scanner 100 for reading an original image placed at the center of the structure, a monitor 200 for color-displaying the read image and the image to be outputted placed on the scanner 100, and a main desk 101 on which the scanner 100 is mounted. The scanner 100 has an original table 110 at the front thereof, in which table the original cassette which will be explained lately is charged. The original table 110 slides into the installation in order for line-scanning the color originals. An input unit 300 into which the necessary instructions and the like are inputted by an operator is placed on the main desk 101. A signal processing section (color processor) 400 for processing the image data read from the original and calculating the necessary calculation in order to output the separation signals of C, M, Y and Black (K) is placed under the main desk 101. The input unit 300 has a keybord 301 through which the operator inputs the data and instruction and a CRT 302 for displaying the necessary information for operating the system. An output unit 500 situated in side by side relation at the main desk 101 outputs an halftoned film on the basis of the data processed by the signal processing section 400. The automatic developing unit 600 for developing the film for separation making outputted from the output unit 500 is provided. It is understood that the shape and arrangement of respective units above are not limited to these shown in FIG. 6.

Figure 7:
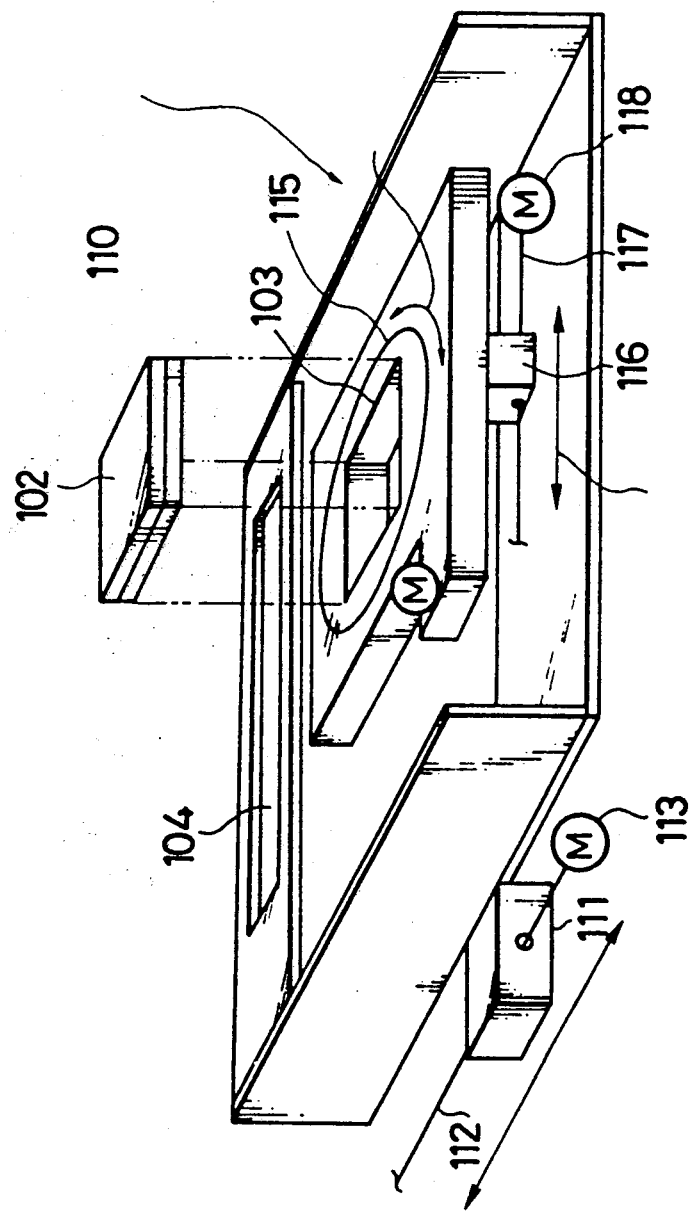
FIG. 7 is a constructive view of an example of the original table of this invention.

FIG. 7 shows the construction of the original table 110 of the scanner 100. The original table 110 of a box-like is adapted to be scanned along the auxiliary scanning direction by means of a moving member 111 connected to the construction of the original table 110, a wire 112 connected to the moving member 111, and a motor 113. There is a rotary base receiver 115 driven along the arrow shown by a motor 114 in the interior of the original table 110 and there is a cassette receiver 103 to which the original cassette 102 is applied at the center of the rotary base receiver 115. The rotary base receiver 115 is adapted wholly to carry out a scanning operation along the trimming direction shown by a moving member 116 connected to the structure of the rotary base receiver 115 and a wire 117 joined to the moving member 116 and a motor 118. It is possible to carry out scanning operations of the moving members 111 and 116 by means of another mechanism, such as a screw bar and nuts. A correction region 104 for reading the magnification adjusting chart when the image reading starts so as to adjust the optical system is situated on the surface of the original table 110 at the end of the auxiliary scanning operation.

Figure 9:
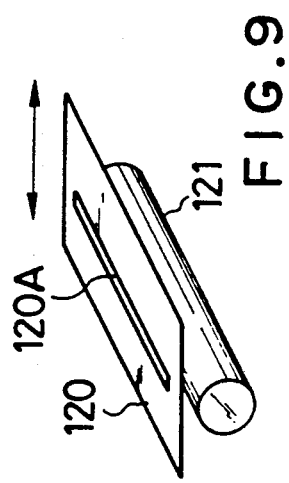
FIG. 9 is a view showing a linear scanning by means of the relation between the light source and the original.
Figure 8B:
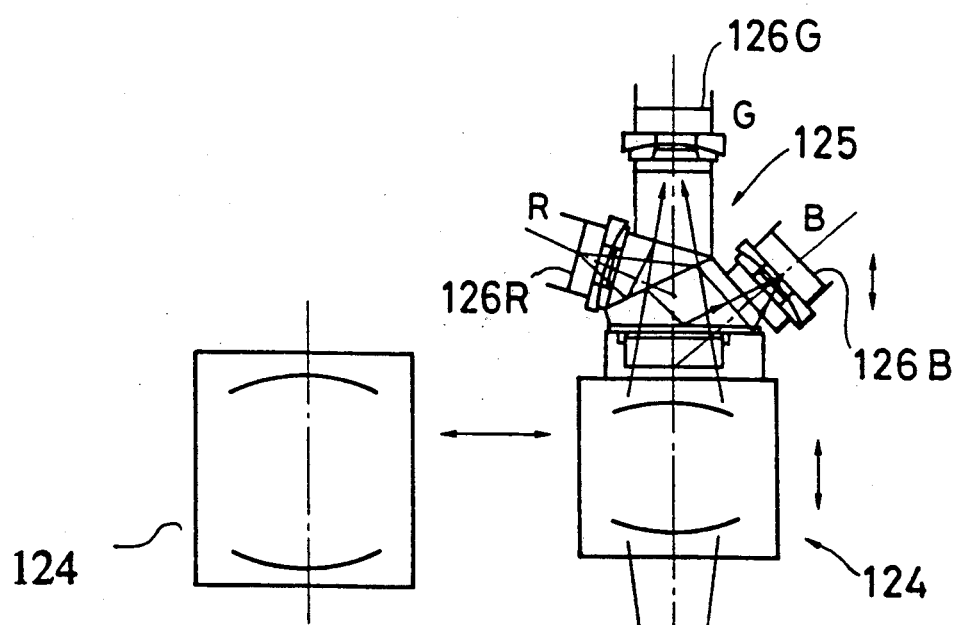
FIG. 8B is a view showing the image focusing lens.
Figure 8A:
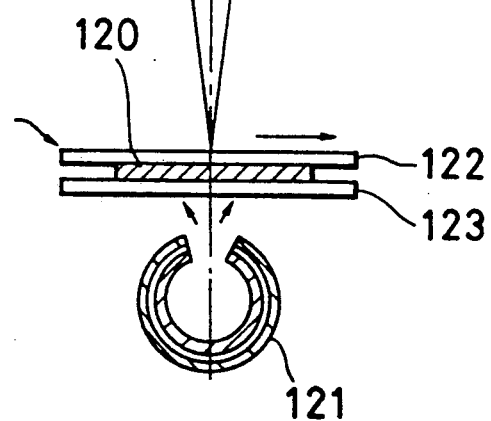
FIG. 8A is an optical system of the image input section.

FIG. 8A depicts an optical system of the input portion of the scanner 100. As shown the original cassette 102 received in the cassette receiver 103 is illuminated by a linear-shaped aperture type fluorescent lamp 121 arranged at a lower position. In the original cassette 102, a color original 120, for example, a color reversal film and the like is fitted or stored and the color original 120 is sandwiched by a pair of anti-reflection type transparent glass 122 and 123 for holding the color original. The image light beam passed through the original cassette 102 is inputted to an image focusing lens 124 of a magnification set by the input section 300 and also inputted to a color separating prism 125 connected to be upper portion of the image focusing lens 124, separating into the three primary colors of Red, Green and Blue. These three primary colors separated are inputted to image sensors 126R, 126G and 126B, respectively consisting of CCD (Charge Coupled Device) and the like and then converted to image signals PS of R, G and B. A plurality of image focusing lenses 124 of different magnification appointed are prepared on a turret mechanism and any lens can be used easily. FIG. 9 shows a line-scanning relation between the fluorescent lamp 121 and the color original 120. The whole image is read when the linear shape main scanning line 120A moves along the auxiliary scanning direction. The input optical system described above can roughly scan the color original 120 before the main scanning thereof.

Figure 10:
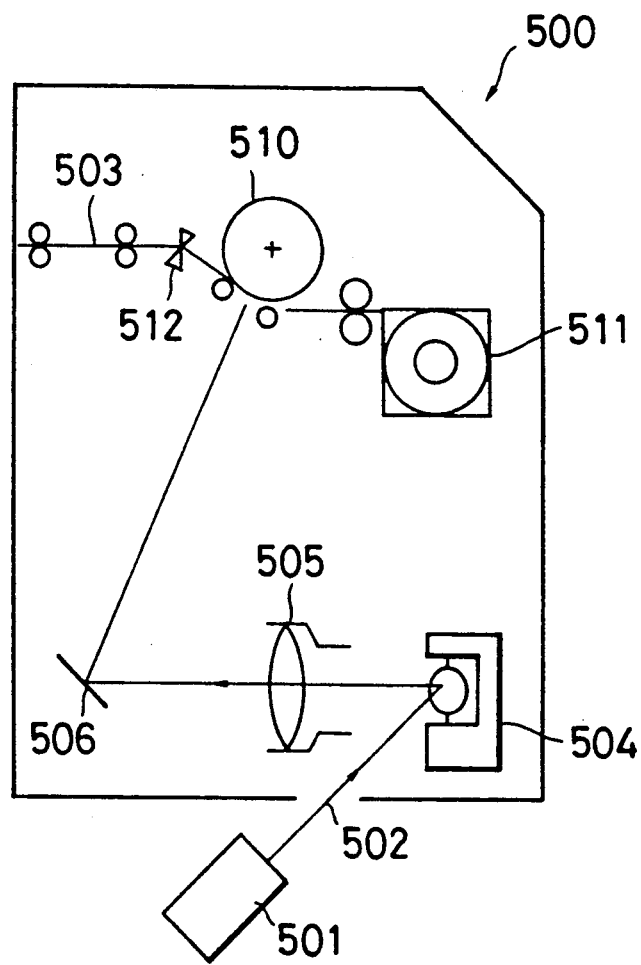
FIG. 10 is a conventional view of one of the embodiments of the output unit.

FIG. 10 shows roughly the construction of the output unit 500, which functions as a slave of the signal processing section 400, carrying out a fixed control sequence on the command transferred by RS-232C and returning the resultant condition to a host machine CPU 401 of the signal processing section 400. That is, when a status check signal is sent from the CPU 401 to the output unit 500, the output unit 500 outputs a "READY" signal when it is exposable condition and returns a "OK" signal responsing to exposure preparation inquiry signals sent from the CPU 401 in order to carry out the exposure. The image signal sent from the signal processing section 400 is halftoned in a halftoning circuit 531 which will be described later so as to be converted to ON/OFF signals. Thus, the ON/OFF signals are exposed on a photosensitive material 503 by a laser beam 502 emitted from the laser shaping light source 501 consisting of laser diodes. The main scanning of the lesser beam 502 is done by using resonant scanner 504 and the mainly scanned laser beam exposes the photosensitive material 503 rounded around the auxiliary scanning drum 510 through fθ lens 505 and a mirror 506. The auxiliary scanning drum 510 carries out an auxiliary scanning relative to the laser beam 502 and the auxiliary scanning drum 510 is driven by a DC servomotor controlled on PLL (Phase Locked Loop). The photosensitive material 503 is stored in a photosensitive magazine 511 and transferred around the auxiliary scanning drum 510 through a transfer roller. Then, the exposure material 503 is cut by a cutter 512 at a predetermined length and discharged out of the output unit 500.

The halftone processing of the image carried on by the halftoning circuit 531 is digitally done by sequentially comparing the image signal to a dot (halftone data) of the thershold values of eight bits. The standard halftone data are stored in an ROM and other halftone data is loaded in the system from the optional floppy disc. The output unit 500 is always a slave of the signal processing section 400, only processes the commands sent from the RS-232C at fixed sequence and returns the resultant condition to the signal processing section 400. The output unit 500 can not activate communication by oneself.

Because of such construction of the output unit 500, a series of sequential processings during an exposing are carried out when the signal processing section 400 controls the output unit 500 through a communication. The output unit 500 further has functions which are initialized through a panel of the signal processing section 400, such as initial loading, cleaning, cutting, and a set of the remaining photosensitive material register. The initial loading means feeding of the photosensitive material 503 by the predetermined length so as to cut or remove the exposed portion of the photosensitive material. When the photosensitive material magazine 511 is loaded or a material-jamming is happened and the cover is open, attaining the initial condition. The cleaning means an operation, in which a predetermined volume of the photosensitive material 503 is drawn out and cut, sent to the automatic developing unit 600 so as to operate the automatic developer supplying developing liquid, a fixing liquid, and washing water. The cutting is an operation in which the photosensitive material 503 drawn for exposing is cut and discharged. In the setting of the remained photosensitive material register, the remained volume of the exposure material is set when the photosensitive material magazine 511 is loaded, the set volume is reduced at each cutting and discharging step, and the resultant is displayed.

Figure 11:
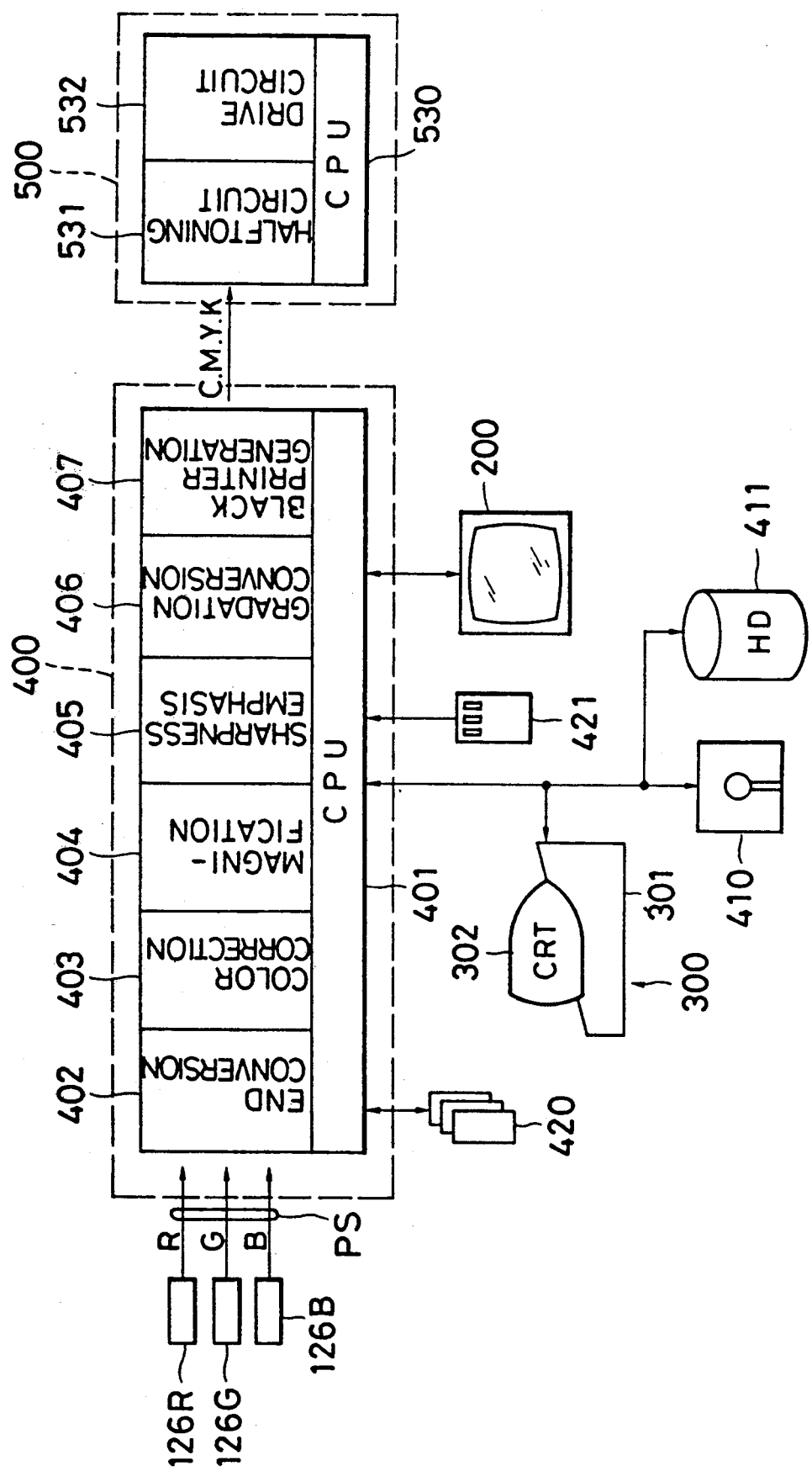
FIG. 11 is a block diagram to show the circuitry of the color according to this invention.
Figure 12:
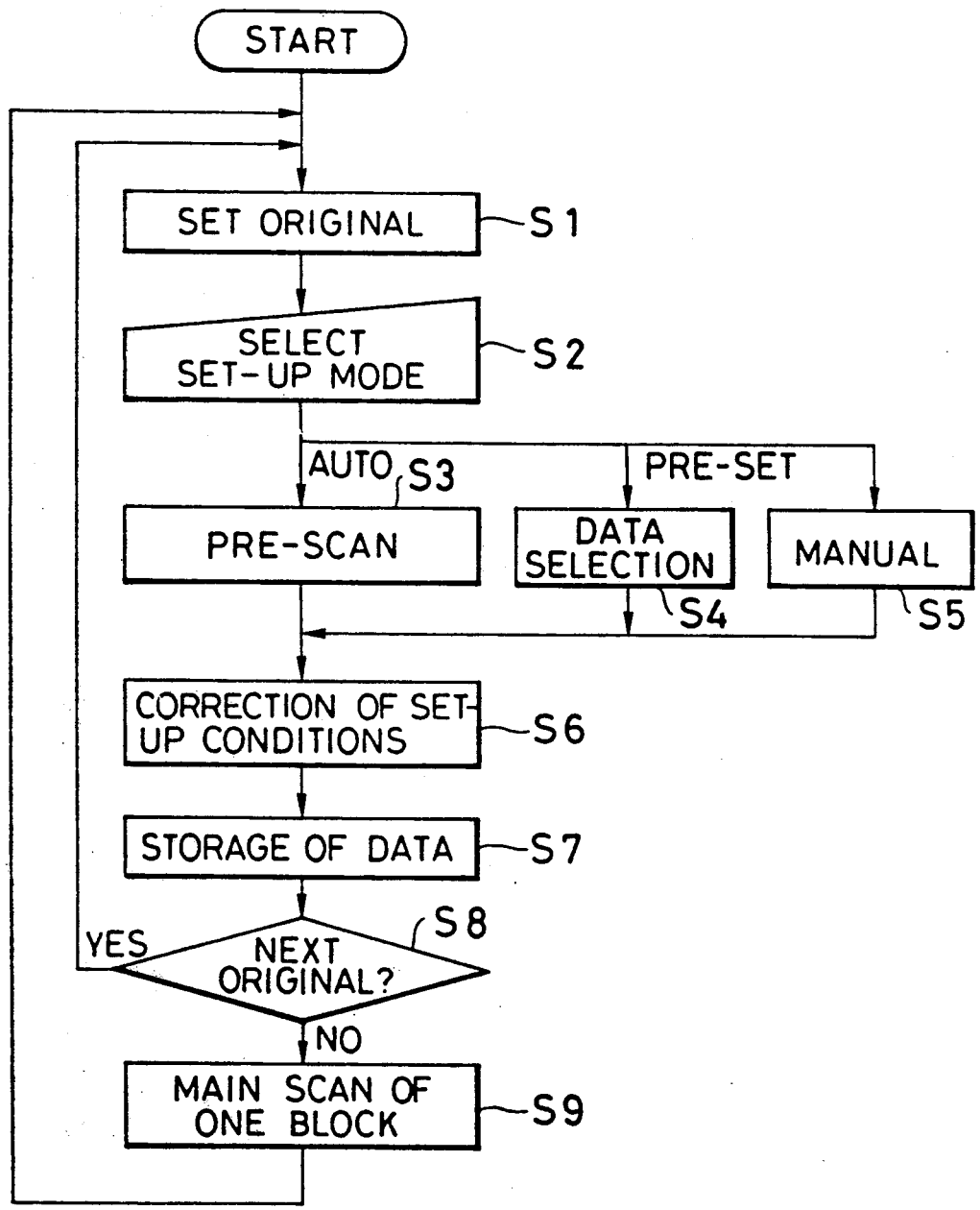
FIG. 12 is a flow chart to show the operation of this invention.

The inner construction of the color scanner is shown in FIG. 11, in the system the RGB image signals PS outputted from the image sensors 126R, 126G and 126B of the scanner 100 are inputted to the signal processing section 400. The image signals PS consist of the rough-scan data obtained by a rough-scanning or a main scan data obtained by a main scanning, and these scan data respectively are digitized and inputted to the signal processing section 400. The signal processing section 400 has a CPU (host computer) 401 for controlling the whole functions of the signal processing section 400, which the CPU 401 functioning as necessary an END (Equivalent Neutral Density) conversion 402, a color correction 403, a magnification 404, sharpness emphasis 405, a gradation conversion 406 and black printer generation 407. The signal processing section 400 has as shown in FIG. 11 a floppy disc 410 and a hard disc 411 connected thereto through which discs the necessary data is read and stored. An image memory 420 is operatively connected to the signal processing section 400 so as to temporarily store the rough-scan data and a mouse 421 is so connected as to input necessary instructive informations to the signal processing section 400. The monitor 200 and the input unit 300 are connected to the signal processing section 400 so as to send separation making signals of four colors of C, M, Y, K (black) signalized to the output unit 500, consequently the laser shaping light source 501 emits the laser beam 502 through the halftoning circuit 531 and the drive circuit 532. The halftoning circuit 531 and the drive circuit 532 are adapted to be controlled by the CPU 530. The signal processing section 400 reads the rough-scan data in the image memory 420 to calculate the characteristic values of an accumulative histogram and the like, processes the original classification information, such as over-exposure/under-exposure and the like on the basis of the characteristic values above, automatically sets parameters of the processing condition, and outputs a certainty factor. It is possible to input the scanning informations, such as a trimming range, a magnification, output line number, a halftone angle and the like and start/stop commands for sequence-controlling through the keyboard 301 and the mouse 421.

The operation of the construction of the signal processing section 400 will be explained with reference to flow charts.

First, the original cassette 102 is set to the scanner 100 by inserting the original cassette 102 into the cassette receiver 103 (Step S1) and designating the condition set-up mode (automatic, pre-set, manual) by the operator operating the keyboard 301 of the input unit 300 (Step S2). According to this invention, when an automatic mode is selected, a pre-scanning for condition-setting is carried out by a rough-scanning (Step S3). When the pre-set mode is selected, the previously stored condition data is outputted. (Step S4.) In case that the manual mode is selected, the condition data is inputted manually through the keyboard 301 (Step S5). The condition data are coefficient values for color-correction, sharpness coefficients for sharpness emphasis inclination of gradation change conversion and so on. The automatic setting by the rough-scanning will be explained. Thus set signal processing conditions are displayed together with the certainty factor on the CRT 302. When the signal processing conditions have a low certainty factor relative to the set conditions and some correction is necessary, the operator corrects manually the setting parameters (Step S6) and the condition data is stored (Step S7).

Figure 13:
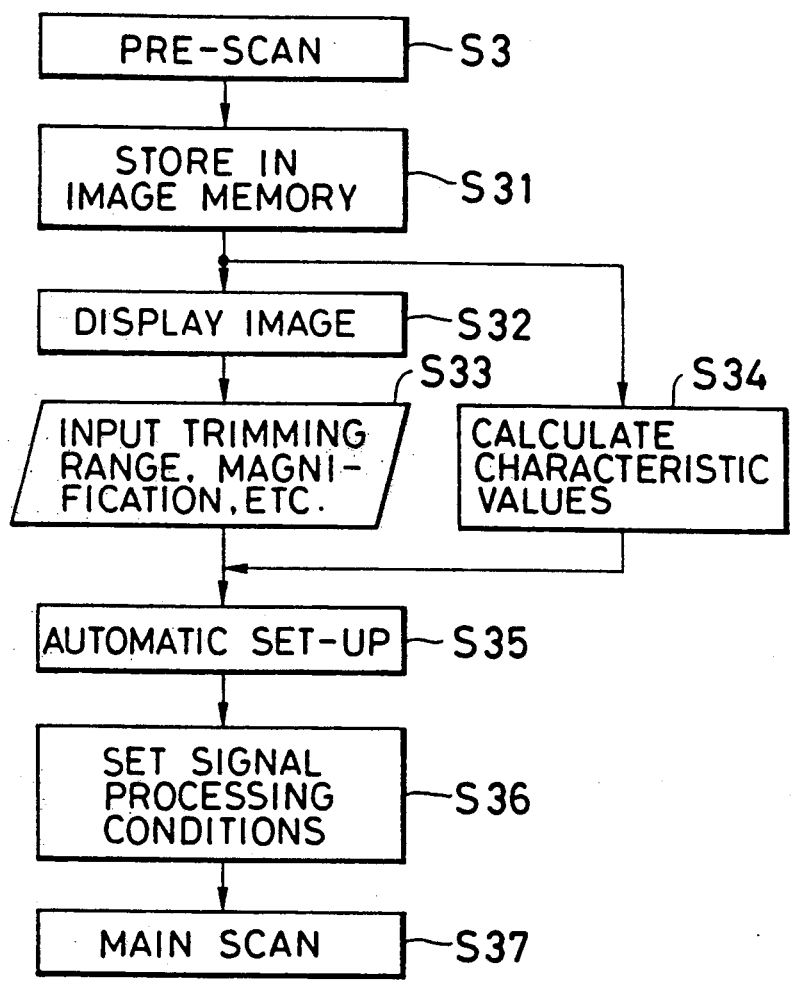
FIG. 13 is a flow chart showing an example of the signal processing condition setting method of this invention.

The automatic setting of the signal processing conditions by the pre-scanning will be explained with reference to FIGS. 13 and 14. The pre-scan data PD obtained by the pre-scanning is stored in the image memory 420 (Step S31) and the image of the particular original is displayed on the monitor 200 (Step S32) so as to do a calculation of the characteristic values CR (Step S34). Various characteristic values CR consist of the density (level) at any percent of the accumulative histogram for each color of RGB, the level value of the accumulative histogram for each color in respective region of display frame divided (for example, ¼, ⅛), means density for each color of RGB, and the maximum peak density of the histogram for each color. FIG. 15A shows an example of the accumulative histogram and how to obtain the density at any percent of the accumulative histogram. FIG. 15B shows an example of the histogram and how to obtain the maximum peak density of the histogram. The original classification informations OC are calculated according to the rule describing the relationship between the characteristic values CR and the original character. For example, the original classification informations OC are obtained according to the following rule.

Figure 16:
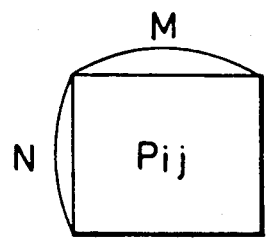
FIG. 16 shows an example of the density data.

As shown in FIG. 16, the rough-scan data is the density data $P_{ij}$ of M×N picture elements. The mean value x as the characteristic value CR is determined in the following equation.

$$x = \Sigma P_{ij}/MN \qquad (1)$$

When the key of the original is fuzzy-reasoned as described hereinafter as the original classification informations OC, you must follow to the following rules ⓐ to ⓒ with the attribute determination name y of the original key.

Rule ⓐ: if x=low, then y=high key.
Rule ⓑ: if x=middle, then y=normal.
Rule ⓒ: if x=high, then y=low key.

Figure 17:
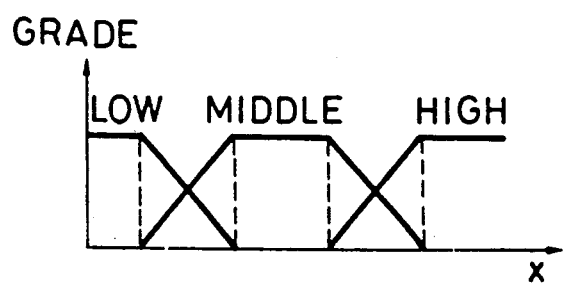
FIGS. 17 and 18 are examples of the membership function, respectively.
Figure 18:
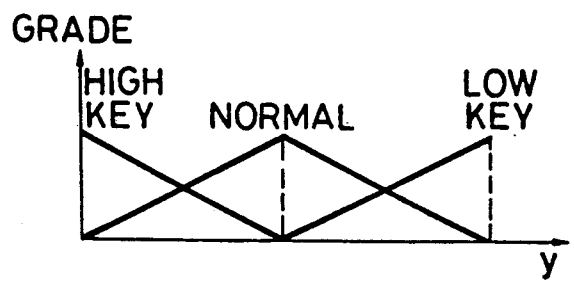
Figure 19:
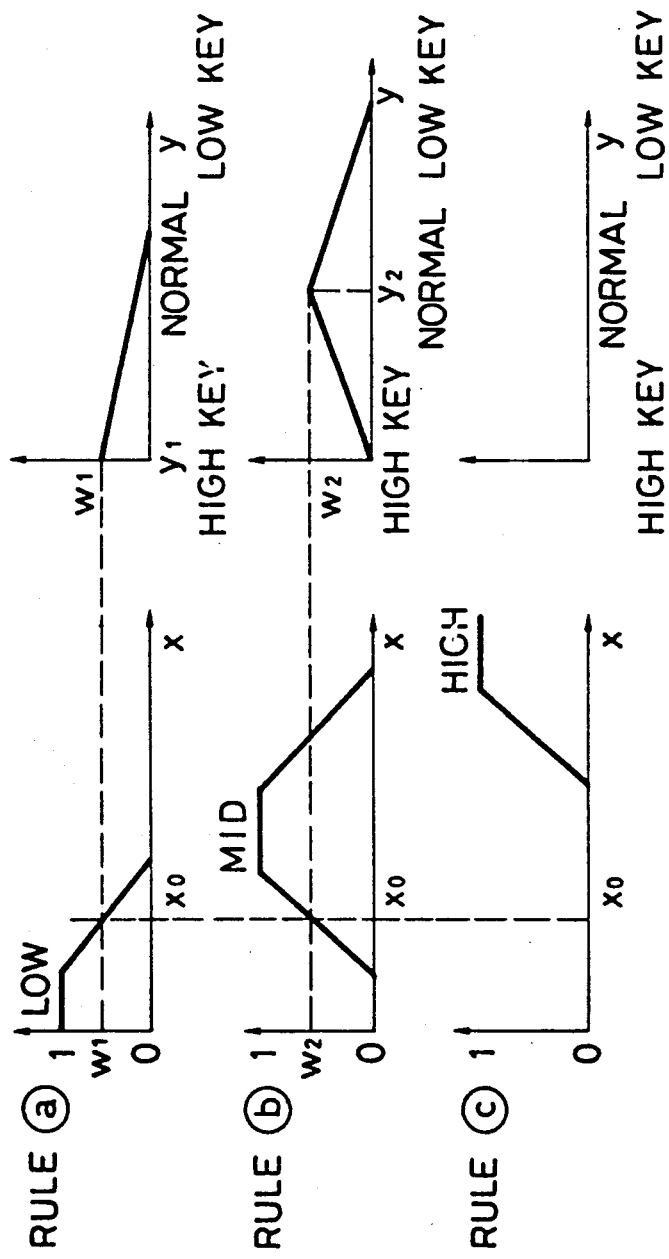
FIGS. 19 and 20 are diagrams for explaining the calculation of certainty factor in the fuzzy reasoning, respectively.

The underlined words in these rules ⓐ to ⓒ mean fuzzy variables. The functions shown in FIG. 17 are used as membership functions to be used in the If-portions and the functions shown in FIG. 18 are used as membership functions to be used in then-portions in the rules ⓐ to ⓒ above. Presupposing that $x = x_0$ is inputted, the rules ⓐ to ⓒ become these shown in FIG. 19. The grade of the original key $y_1$ (high key) in the rule ⓐ is $W_1$, the grade of the original key $y_2$ in the rule ⓑ is $w_2$, and it is not suitable or not conformity of the original key $y_3$ (low key) as apparent from the rule ⓒ. The whole outputs y of these rules ⓐ to ⓒ are obtained by weighing the outputs $y_1$ to $y_3$ from each rule with the grades $w_1$ to $w_3$. Accordingly, the whole outputs y is a weighted mean value as shown below.

$$y = (w_1 \cdot y_1 + w_2 \cdot y_2)/(w_1 + w_2) \qquad (2)$$

The equation is generalized by a rule number $\underline{n}$, obtaining the following equation.

$$y = \sum_{i=1}^{n} w_i \cdot y_i / \sum_{i=1}^{n} w_i \qquad (3)$$

The grade $w_1$ is a value showing the degree of its suitability to each rule or it is a certainty factor of respective rules. The certainty factor $\underline{w}$ of the whole output $\underline{y}$ in the case above is obtained using FIG. 20 as shown below.

$$w = \frac{w_2 - w_1}{y_2 - y_1} \cdot (y - y_1) + w_1 \qquad (4)$$

Generalizing the equation above, the certainty factor of the whole output $\underline{y}$ is $y_n \leqq y \leqq y_{n+1}$. Selecting $Y_n$, $y_{n+1}$, $w_n$, $w_{n+1}$, it is determined by the following equation.

$$w = \frac{w_{n+1} - w_n}{y_{n+1} - y_n} \cdot (y - y_{n+1}) + w_n \qquad (5)$$

Figure 20:
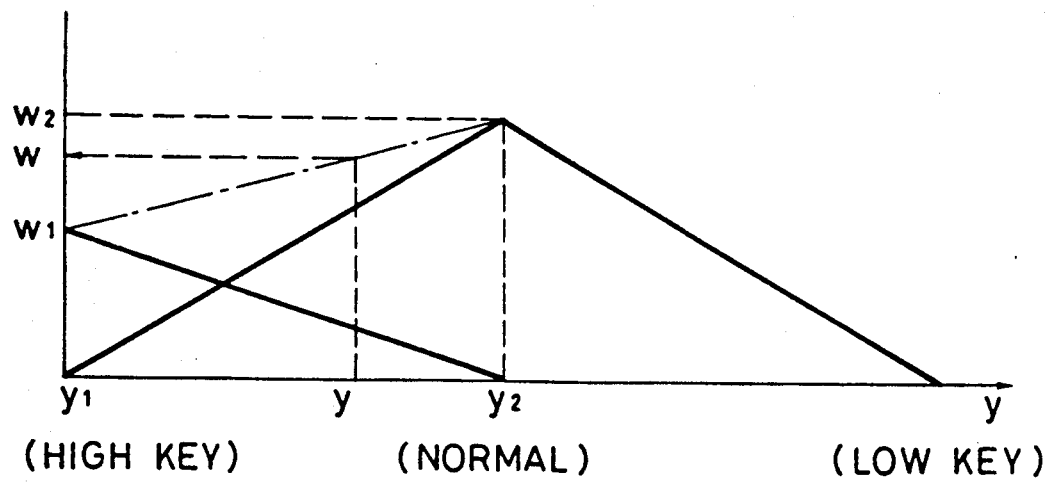

It is possible that the membership functions in the then-portion don't have actually the shapes of function as shown in FIG. 20. It is sufficient that the membership functions clarify the grades of $y_1$, $y_2$ in short.

As described above, the original key is induced according to this invention by using the fuzzy reasoning process, as just described, and the certainty factor $\beta$ of the fuzzy reasoning process is determined, outputting the certainty factory. When the certainty factor $\beta$ is lower than a predetermined value (for example, 0.4), the operator will input a supplemental information of the high, low or normal key. When any supplemental information is not inputted, the fuzzy reasoning doesn't carry out. Accordingly, the information obtained after the original is rightly judged can be inputted.

Various conditions of exposure conditions of under-/over, existence of highlight point, picture pattern, existence of skin color, color fogging and the like can be determined by using the fuzzy reasoning process. For example, with reference to the original exposure condition of the minimum density Dmin shown in FIG. 15B, the fuzzy reasoning shown below can be used. If Dmin=low, then y=over-exposure. If Dmin=middle, then y=normal-exposure, and If Dmin=high, then y=under-exposure.

In the automatic setting method of the signal processing conditions according to this invention, the operator inputs the trimming range and so on through the input unit 300 while watching the image display on the monitor 200 (Step S33), sets the parameters by using the original classification informations OC obtained as described above (Step S35), sets the signal processing conditions (Step S36), and then carry out the main scanning (Step S37). The set-up parameters are the highlight/shadow point density of the gradation conversion curve, the shape of the curve, the sharpness emphasis coefficients, the color correction coefficients and the like.

That is, the image of the color original 120 of the original cassette 102 loaded is read by the scanner 100 after the pre-processing mentioned above. During the reading operation, the original cassette 102 rotates by the rotary base receiver 115, moves along the trimming direction by means of the moving member 116 and along the auxiliary scanning direction by means of another moving member 111 in order to mainly scan the region of the line 120A as shown in FIG. 9. The light beam irradiated from the fluorescent lamp 121 and passed through the original cassette 102 is inputted to the focusing lens 124 and resolved separated into the colors through the color separating prism 125, focusing each beam of colors on respective image sensors 126R, 126G and 126B. The image signals PS for one line of the display detected is outputted from the image sensors 126R, 126G, 126B and inputted to the signal processing section 400, in which each processing of the END conversion 402, the color correction 403, the magnification 404, the sharpness emphasis 405, the gradation conversion 406, the black printer generation 407 is processed at the predetermined conditions. The color correction is done by the method, for example, described in Japanese Patent Application Laid-open No. 178355/1983 and the sharpness emphasis is carried out by the method described, for example, in the specification of Japanese Patent Application Laid-open No. 54570/1985. It is possible to use the method described in Japanese Patent Application Laid-open No. 11062/1984 in order to do these processes above including the END conversion and the gradation conversion. The image formed by the generated image signals of C,M,Y,K is displayed on the monitor 200 and it si possible to control the color tone and so on through the keyboard 301 while watching the displayed image so as to make the display a disired one.

The output signals of C,M,Y,K obtained in the signal processing section 400 are sent to the output unit 500, halftone-processed by the half-tone circuit 531 of the output unit 500 and sent the drive circuit 531 of the output unit 500 and sent to the drive circuit 531 of the laser shaping light source 501, and the output signals are emitted in the shape of binary signal of the halftone output. The laser beam 502 emitted from the light source 502 is inputted to the resonant scanner 504 and the fθ lens 505, reflected on the mirror 506, and the photosensitive material 503 on the auxiliary scanning drum 510. The photosensitive material 503 exposed is cut at its predetermined length by the cutter 512, sent to the developing unit 600 and develops the photosensitive material processing a separation of four colors of C,M,Y and K.

Figure 1:
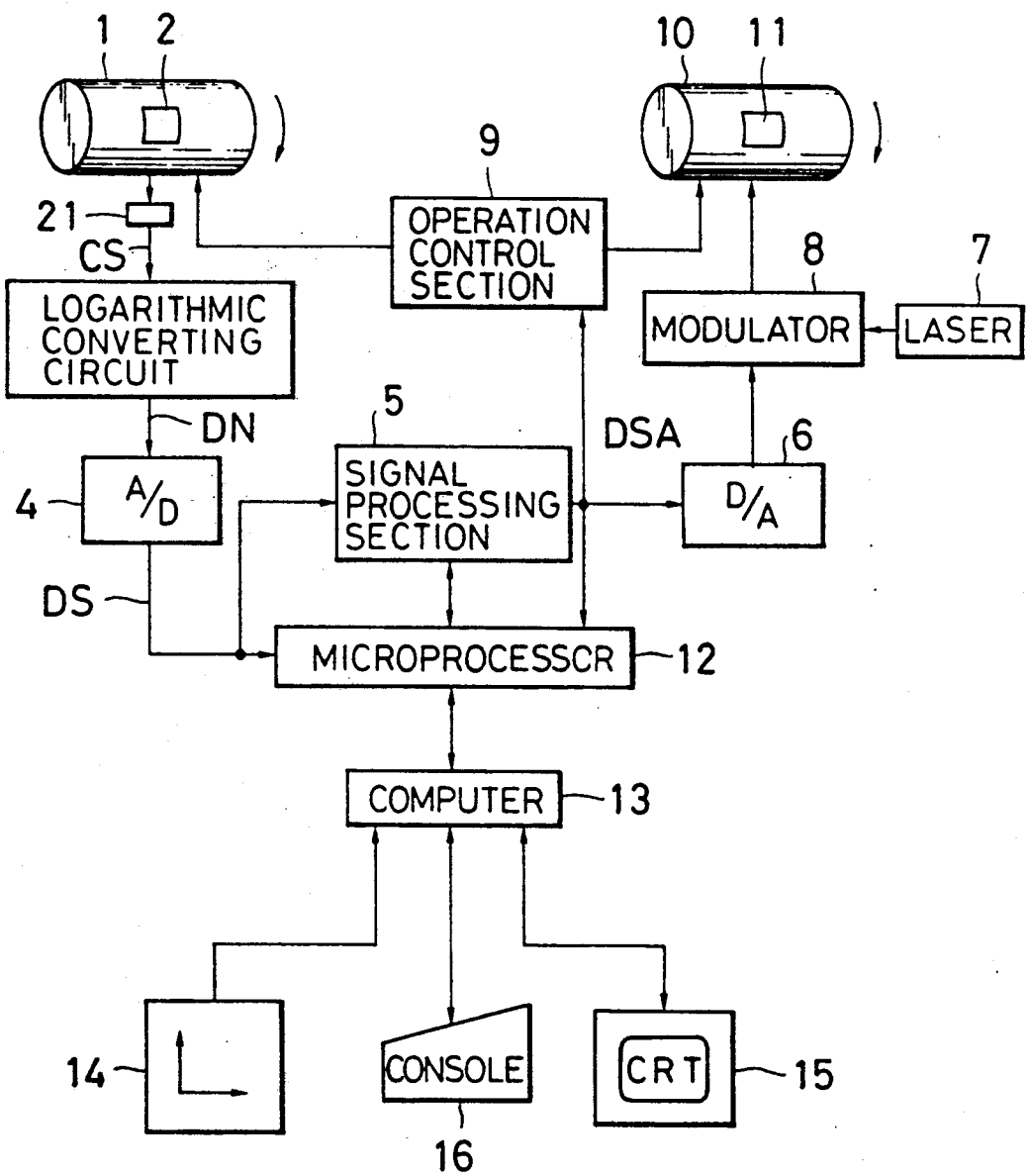
FIG. 1 is a block diagram showing an example of the conventional image input/output system.
Figure 2:
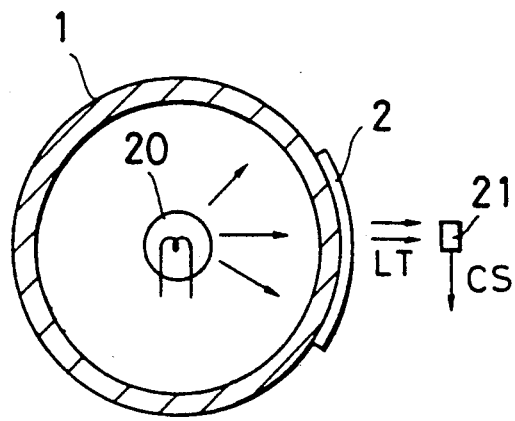
FIGS. 2 to 4 respectively show the application of the color originals to the input drum.
Figure 3:
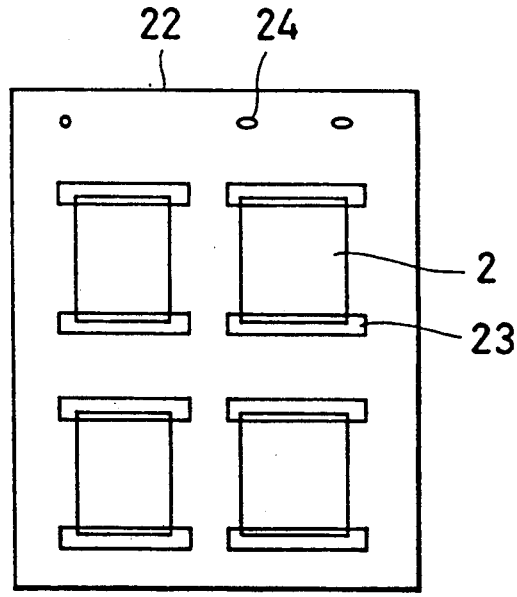
Figure 4:
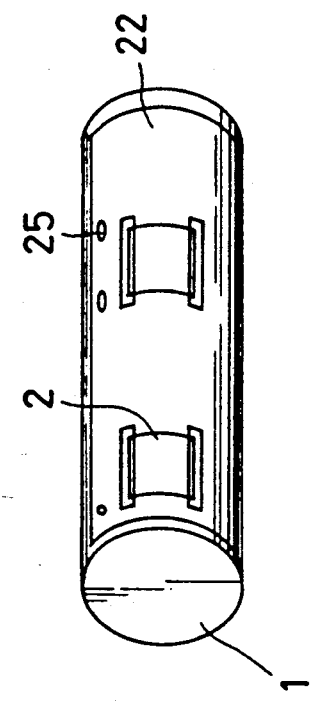
Figure 5:
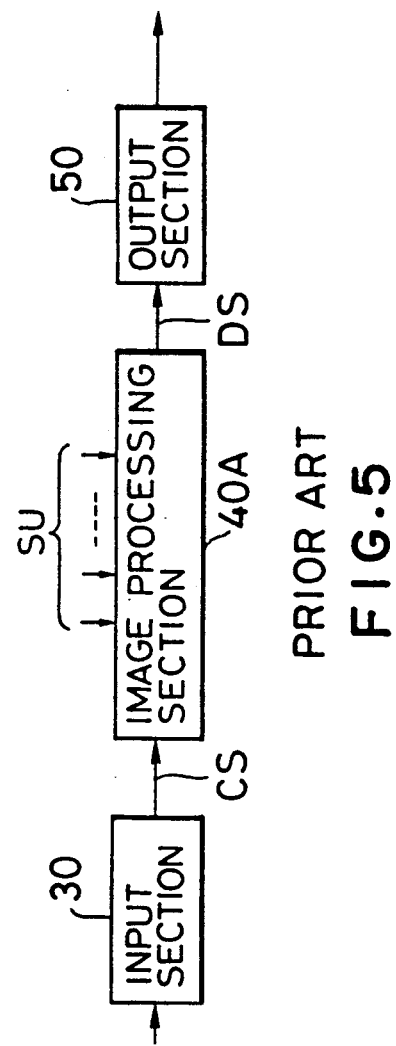
FIG. 5 is a block diagram showing the construction of a conventional color scanner.
Figure 30:
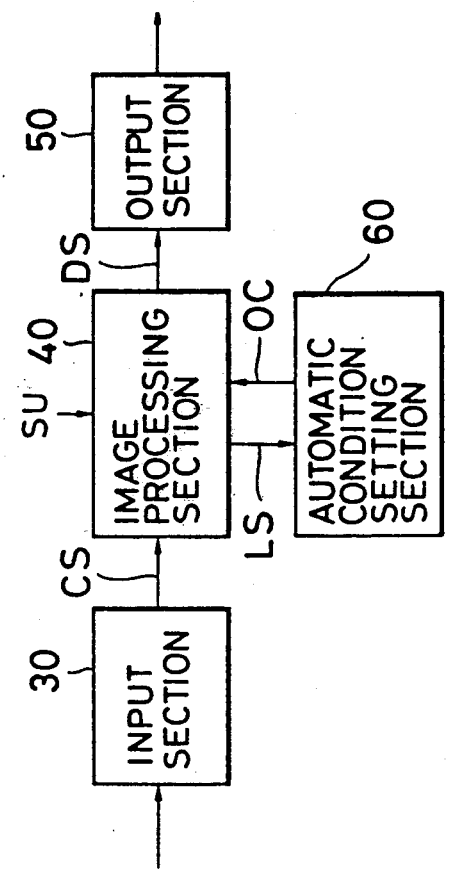
FIG. 30 is a block diagram to illustrate the construction of another embodiment of this invention scanner.

Further, according to this invention, as shown in FIG. 30 corresponding to FIG. 5 an original such as a color reversal film is scanned in an input section 30 so as to be color-separated into picture components of three colors R, G and B, and the color separation signal having these three components R,G and B is inputted to an image processing section 40. The image processing section 40 produces rough-scan data (LS) in response to a rough-scan (pre-scan) and delivers it to an automatic condition setting section 60. The automatic condition setting section 60 produce an original classification informations OC and delivers it to the image processing section 40 so as to automatically set set-up parameters necessary for the image processing. Data other than the processing conditions required by the image processing section 40, i.e., separation conditions SU for the original, are manually inputted by an operator.

Thus, in the color scanner of this invention, the processing conditions are automatically determined in the automatic condition setting section 60, so as to automatically set the set-up parameters necessary for the image processing. Thus, the operator is required only to input the separating conditions (magnification, output size, trimming range, line number of scanning, discrimination between the negative and positive modes and so on) SU, and all other conditions are set automatically so as to improve the efficiency of the scanning process.

The original is automatically transported from the storage section to the input section 30 through an original cassette and the original after the reading in the input section 30 is automatically returned to the storage section, whereby the reading of the original and the output of the original is fully automated.

Figure 14:
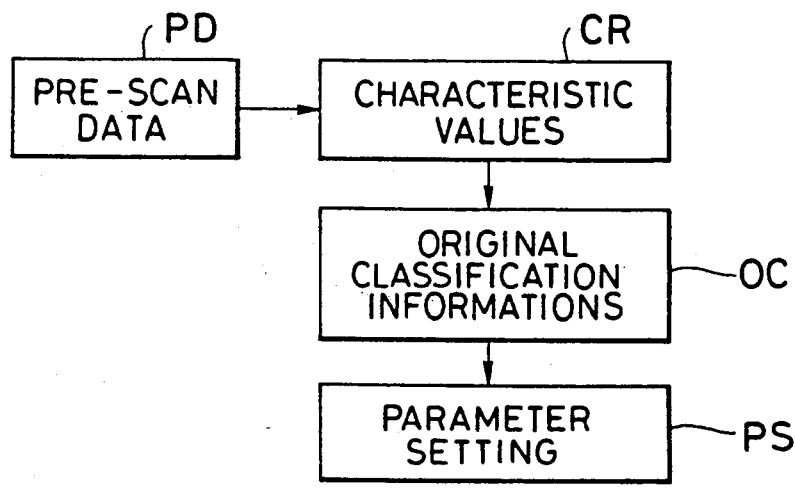
FIG. 14 is a flow chart to show a part of the flow chart of FIG. 13.
Figures 15A, 15B:
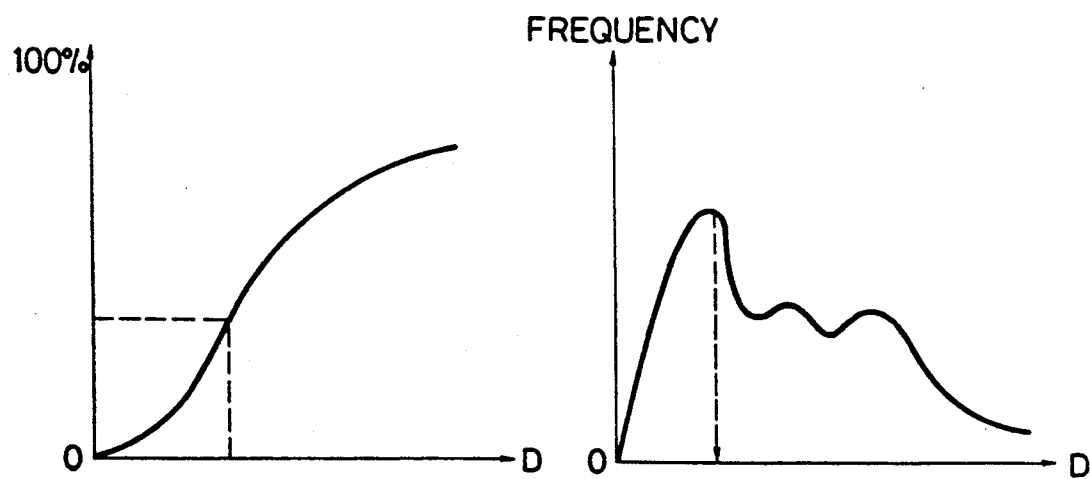
FIG. 15A and 15B respectively show the accumulative histogram and the characteristic relative to the histogram.
Figure 22:
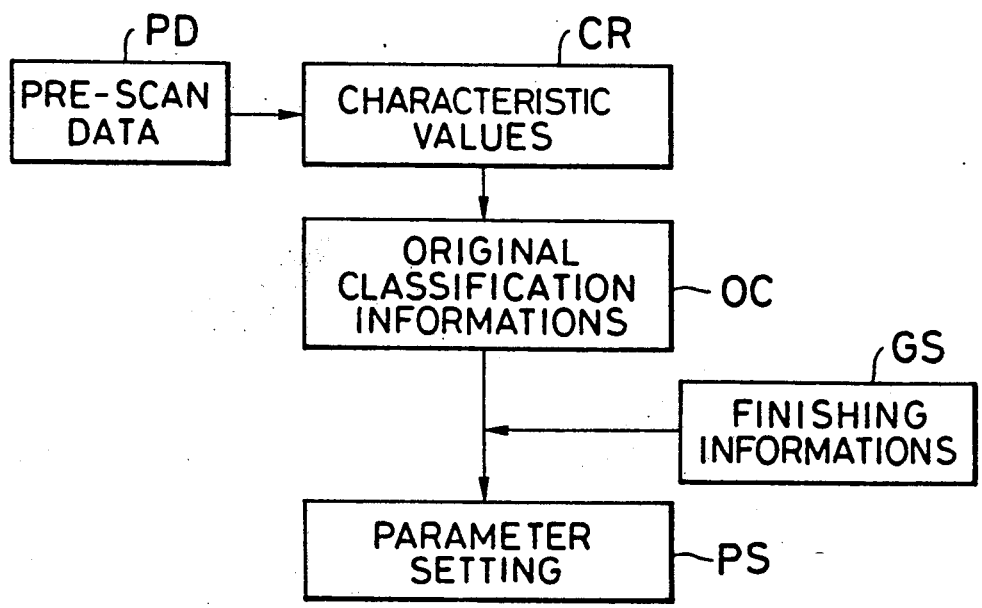
FIG. 22 is a flow chart to show a part of the flow chart of FIG. 21.
Figure 21:
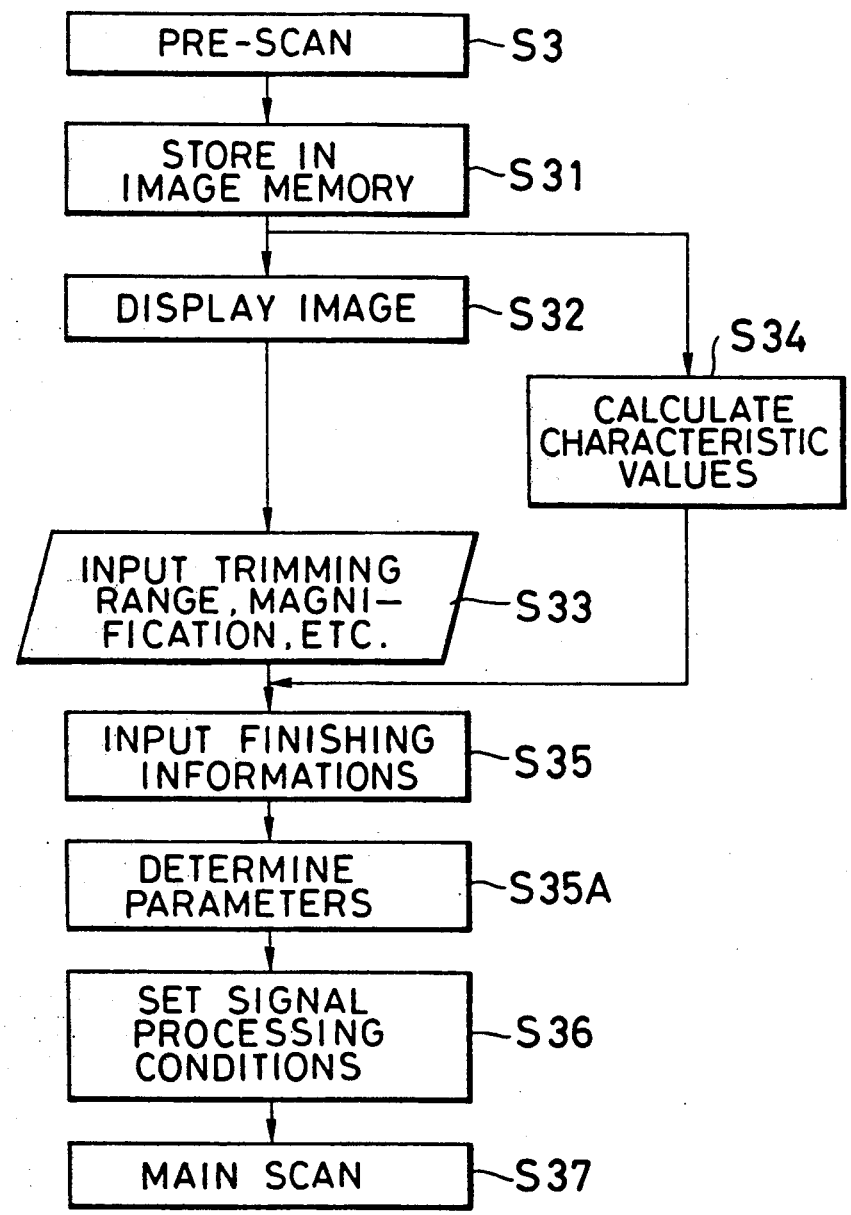
FIG. 21 is a flow chart showing another example of the signal processing condition setting method of this invention.
Figure 33:
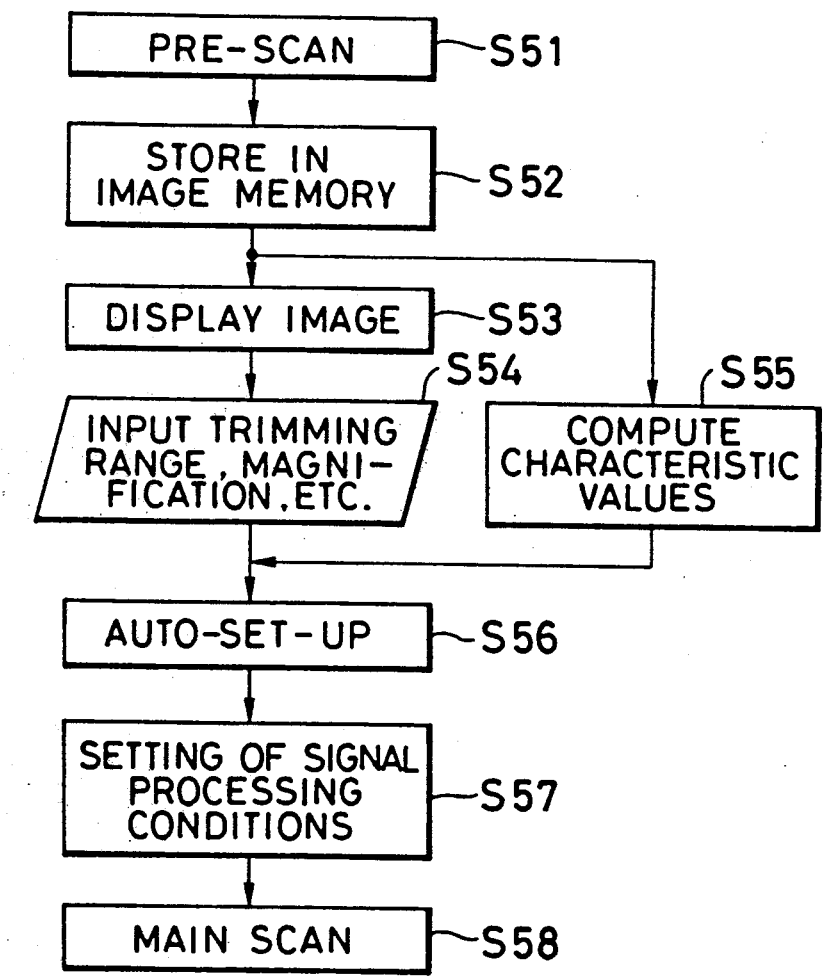

Flow charts of FIGS. 21 and 22 show an example of the operation in the case of inputting finishing information in correspondence to FIG. 33 and 14, respectively. In this case, the inputting step S35A is inserted as shown in FIG. 21 and the finishing information includes gray point, brightness/darkness, preference, tone, type of picture, or the like. Further, the operation of the original classification informations OC is performed by fuzzy reasoning described hereinafter.

Figure 23:
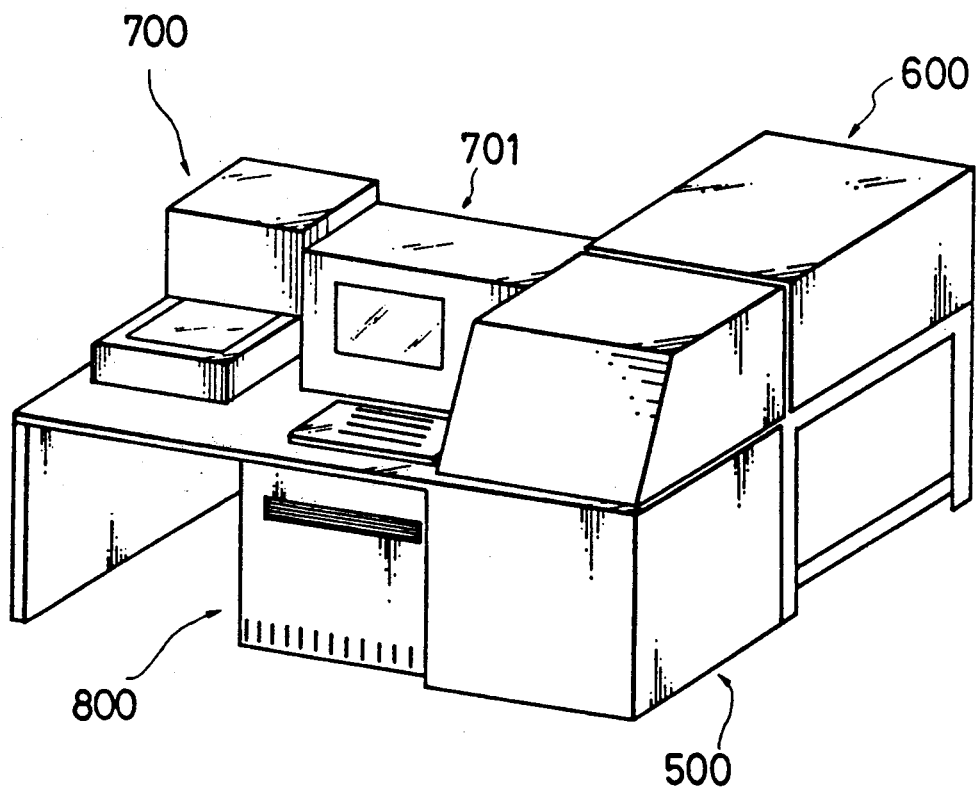
FIG. 23 is an illustration of appearance of an the embodiment of this invention.
Figure 24:
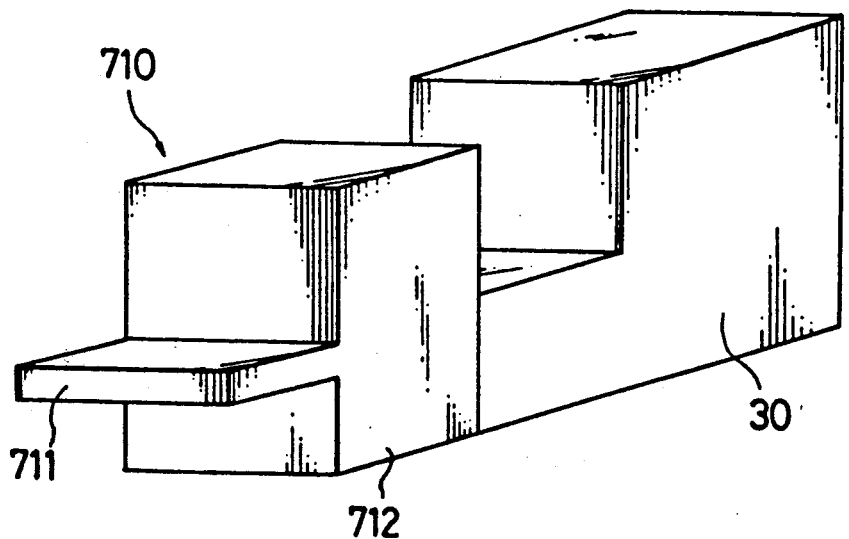
FIG. 24 is an illustration of appearance of a storage and transportation unit.

FIG. 23 illustrates an appearance of the color scanner 700 in accordance with this invention. The color scanner 700 is placed on a desk which also carries an operation panel 701 having a display unit. A signal processing unit 800 is disposed under the desk beneath the operation panel 701. An image output unit 500 as shown in FIG. 10 and an automatic developing unit 600 for developing the images on the output film are disposed in the vicinity of the signal processing unit 800. FIG. 24 shows the manner in which the input section 30 of the color scanner 700 is combined with an original cassette storage and transportation unit 710 which stores and transports the original cassettes holding the originals such as a color reversal film. The storage and transportation unit 107 includes a cassette base 711 for mounting an original cassette and an auto-feeder 712 for storing and transporting a multiplicity of original cassettes.

Figure 25:
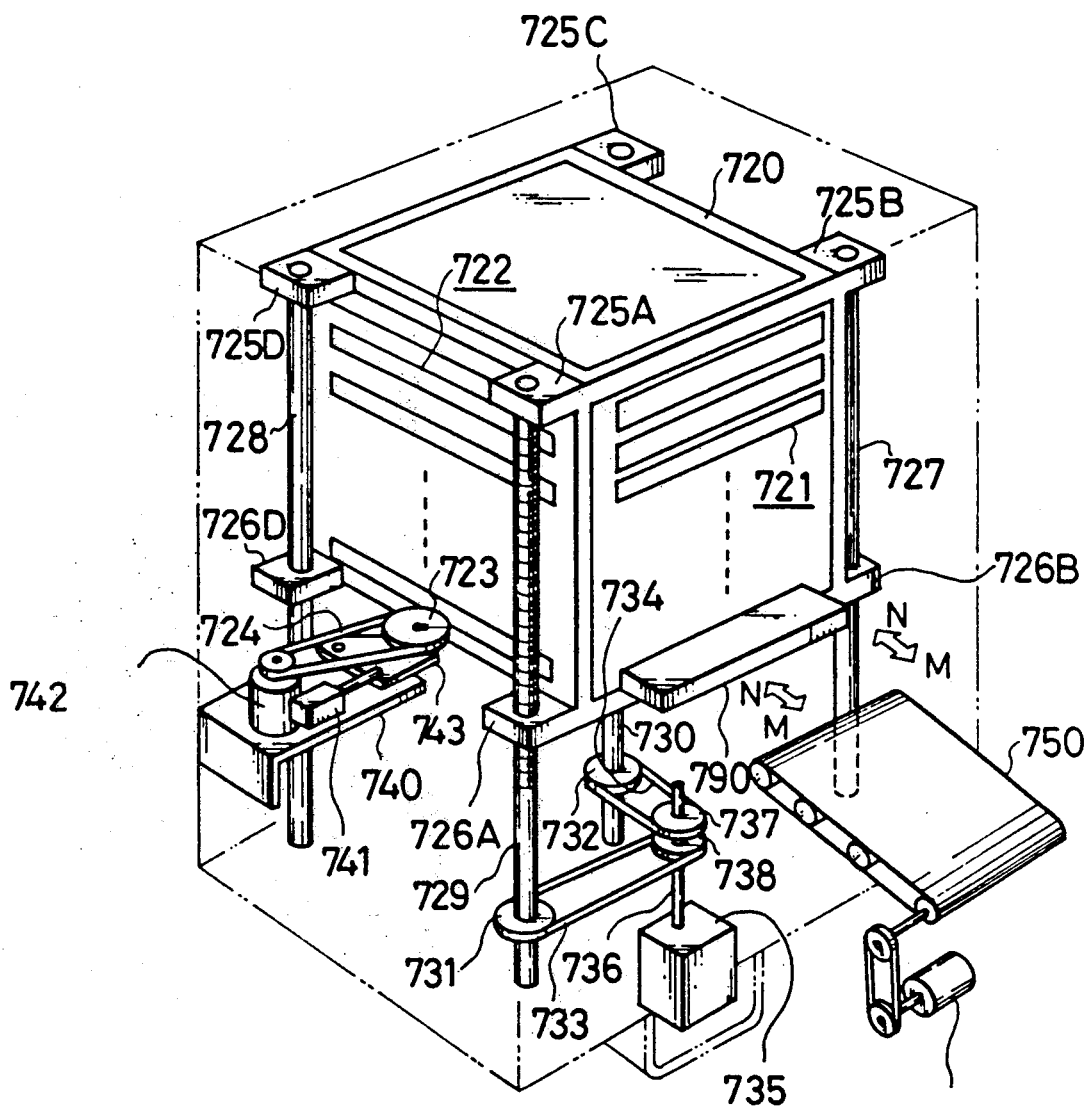
FIG. 25 is an illustration of internal structure of an auto-feeder.

FIG. 25 is a perspective view illustrating the internal construction of the auto-feeder 712. The auto-feeder 712 has a storage box 720 for storing a multiplicity of rectangular parallelepiped original cassettes 790 stacked one on another. Entrances/exits 721 are formed in the front surface of the storage box 720 in stages at a predetermined interval. A plurality of cassette driving windows 722 are formed in one side of the storage box 720 so that the original cassettes 790 can be driven out of and into the storage box 720 as indicated by arrows M and N by means of transportation rollers 723 and elastic belts 724 which rotate and run in pressure contact with the cassettes. Support plates 725A to 725D and 726A to 726D are provided on the top panel and the bottom panel of the storage box 720 at four corners. Circular holes are formed in diagonally opposing pairs of support plates 725B, 726B and 725D, 726D through which are extended round bars 727 and 728. The other diagonally opposing pairs of the support plates 725A, 726A and 725C, 726C are provided with threaded holes. Screw rods 729 and 730 are screwed to these threaded holes so as to extend downward therefrom. Rollers 731 and 832 are respectively secured to lower end portions of the screw rods 729 and 730 and drivingly connected through belts 733 and 734 to a motor 735, so that the rollers 731 and 732 and, hence, the screw rods 729 and 730 are rotated by the motor 735 so as to cause the storage box 720 to move up and down. More specifically, the motor 735 has a motor shaft 736 to which are fixed drive rollers 737 and 738 vertically spaced from each other. The belt 733 is stretched between the rollers 738 and 731, while the belt 734 is stretched between the roller S737 and 732. FIG. 25 shows the storage box 720 raised to the uppermost position and an original cassette 790 being extracted from the lower-most entrance/exit 721.

Figure 27:
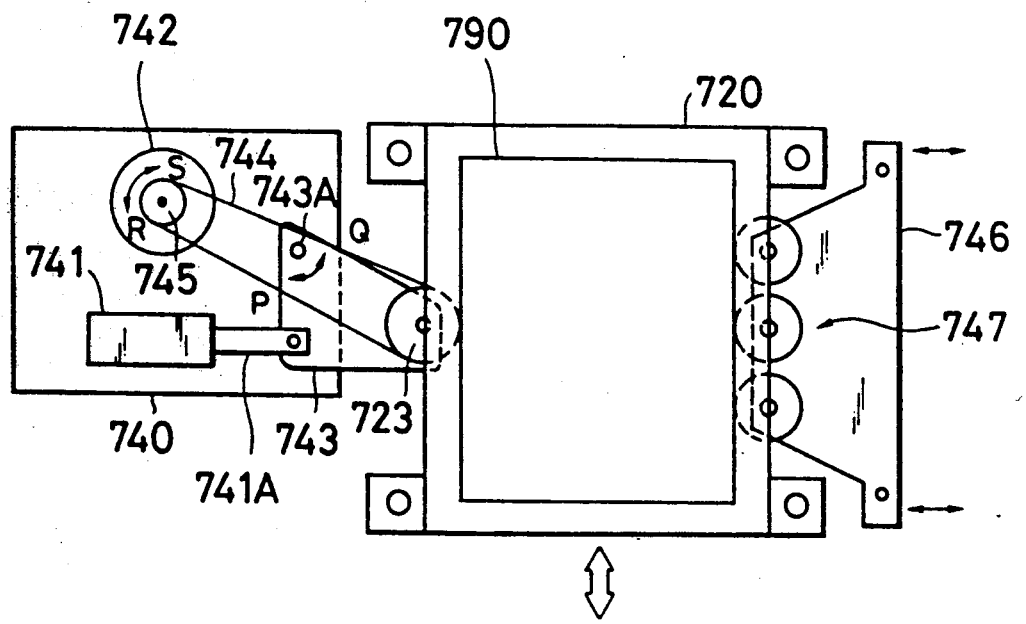
FIG. 27 is a plane view of the auto-feeder.

A cassette drive base 740 is disposed on the storage box 720 at a position adjacent to the cassette driving window 722. As shown in detail in FIG. 27, a motor 742 and a solenoid 741 are carried by the cassette drive base 740. At the same time, a swivel plate 743 is provided on the cassette drive base 740 for swiveling motion about an axis 741A in the directions of arrows P and Q. The solenoid 741 has a plunger 741A which is connected to one end of a swivel plate 743, while a transportation roller 723 for driving the original cassette 790 into and out of the storage box 720 is secured to the other end of the swivel plate 743. An elastic belt 744 is stretched between the transportation roller 723 and shaft 745 of the motor 742. The swivel plate 743 is normally biased for rotation in the direction of the arrow Q about the pivot point 743A by, for example, a spring which is not shown. However, when the solenoid 741 is energized, the plunger 741A is activated to cause the swivel plate 743 to rotate in the direction of the arrow P. Drive plates 746 are disposed on the opposite side of the cassette driving windows 722. The drive plate 746 an array of free guide rollers 747, so that original cassette 790 is allowed to smoothly moved into and out of the storage cassette 720.

Figure 26:
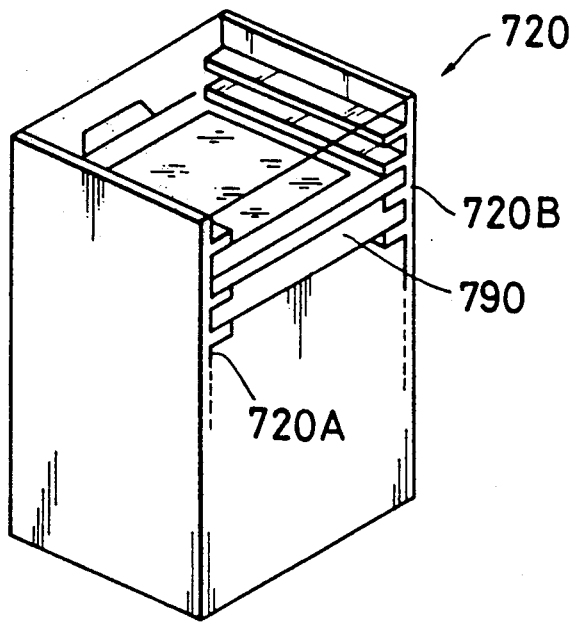
FIG. 26 is an illustration of the construction of storage box.
Figure 28:
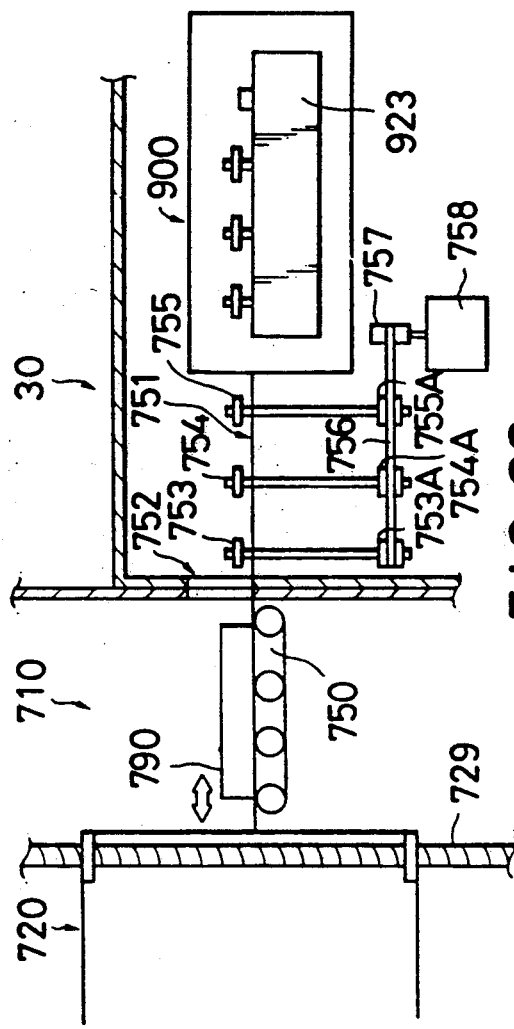
FIG. 28 is an illustration of an arrangement for feeding an original cassette into the input unit of the color scanner.

Referring to FIG. 26 showing the internal structure of the storage box 720, shelves 720A and 720B in the forms of steps are disposed on the inner surfaces of the opposing walls of the storage box 720. The original cassettes 790 are slidably held on these shelves 720A and 720B during movement into and out of the storage box 720. FIG. 28 schematically shows the internal structures of the cassette transportation mechanism 750 and an input section 30 of the color scanner 700. The arrangement is such that an original cassette 790 extracted from the auto-feeder 712 is transported by the cassette transporting mechanism 750 such as a belt conveyor and is moved on to a feed passage 751 through an entrance/exit 752 of the input section 30. Feed rollers 753 to 755 are arranged at both sides of the feed passage 751. These feed rollers 753 to 755 are connected to drive rollers 753A to 755A through drive shafts. A belt 756 is wound around these drive rollers 753A to 755A and a drive shaft 757 of a motor 758, so that the feed rollers 753 to 755 are rotated by the motor 758 so to guide and feed the original cassette 790 along the feed passage 751. The thus fed original cassette 790 is moved into an original table 900 the detail of which will be described with reference to FIG. 7.

Figure 29:
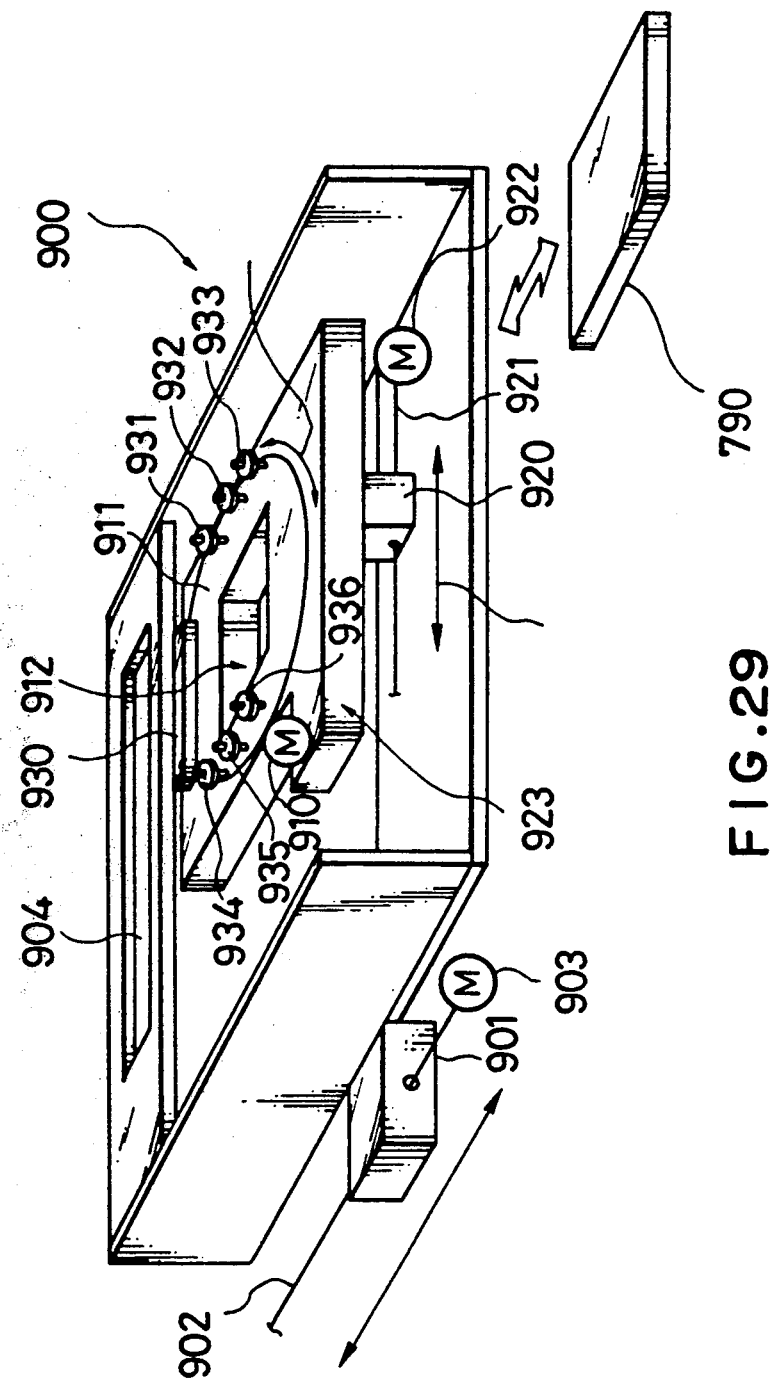
FIG. 29 is an illustration of construction of an original table.

FIG. 29 illustrates the construction of original table 900 of an image reading section which handles the above-mentioned the original cassette 790. The whole of the housing-type original table 900 is capable of moving in the direction of an auxiliary scanning by the action of a moving member 901 which is connected to the original table 900 and which is driven by a motor 903 through a wire 902. A turn-table 911 is provided in the original table 900 so as to be rotated in the directions of arrows by a motor 911. A cassette receiving recess 912 for receiving the original cassette 790 is provided in the center of the turn-table 911. The turn-table 911 has a moving late to which is connected a moving member 920 which in turn is connected to a motor 922 through a wire 921 so that the whole turn-table 911 is capable of moving in the trimming directions by the force produced by the motor 922. A correcting region 904, which is provided on upper leading end of the original table 900 as viewed in the direction of the auxiliary scanning, includes a magnification adjusting chart which is read in advance of reading of the image so as to allow adjustment of an optical system. Guide rollers 931 to 933 and 934 to 936 are arranged on the turn-table 911 at both sides of the original cassette 790. A stopper 930 serving as a locating member for locating the original cassette 790 is disposed near one ends of the tow of the guide rollers 931 to 933 and 934 to 936.

Figure 31:
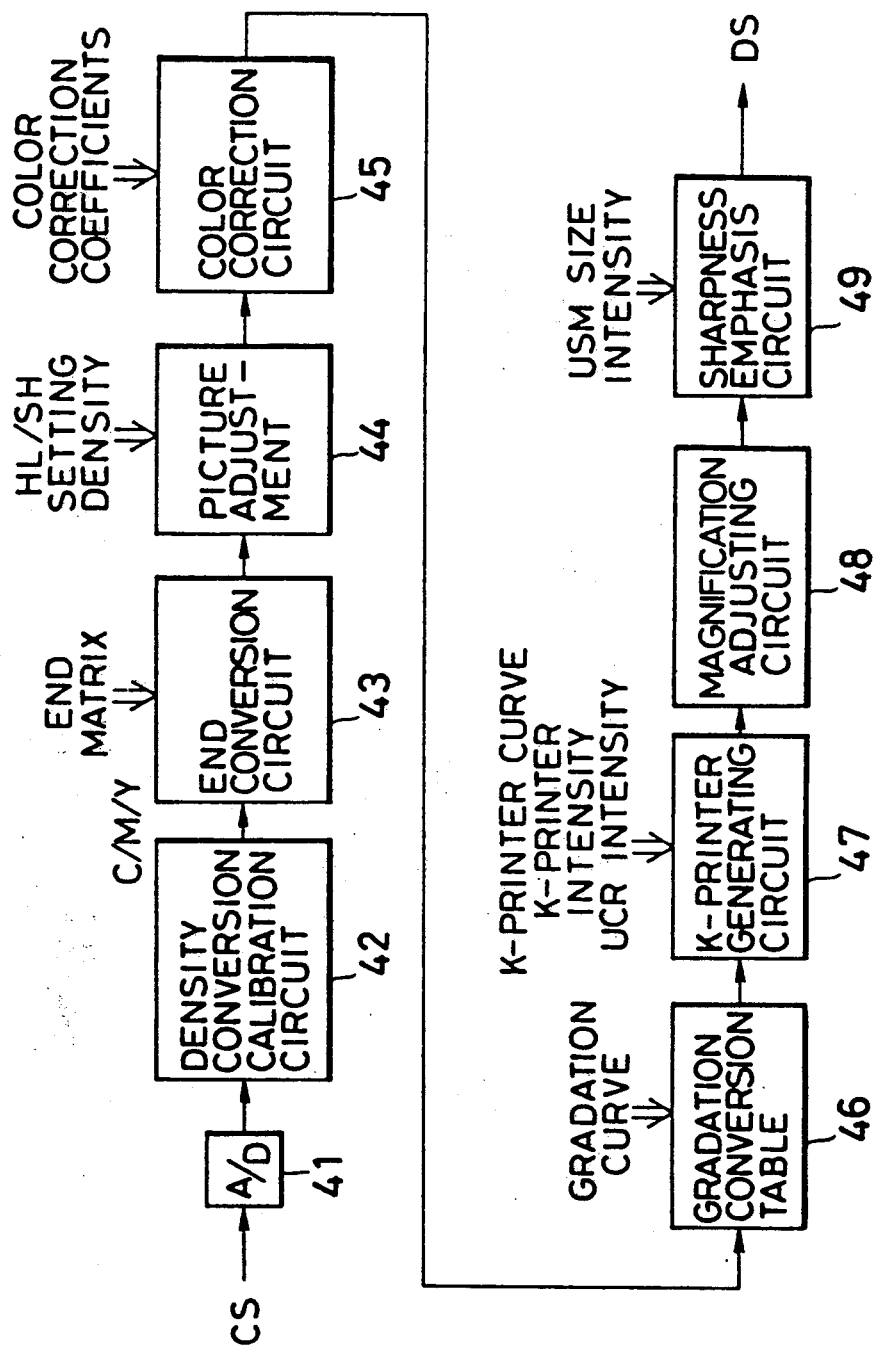
FIG. 31 is a block diagram showing the construction of an image processing section used in the embodiment of this invention.

FIG. 31 is a block diagram showing the detail of the image processing section 40 in the signal processing unit 800. The analog color separation signal CS having tri-color components R,G,B is converted into a digital signal by an A/D converter 41 and is then inputted to a density conversion calibration circuit 42. Then, color signal of C, M and Y are delivered to an END (Equivalent Neutral Density) conversion circuit 43 so as to be END-converted while maintaining gray balance. The END-converted signals are then inputted to a picture adjustment 44. The picture adjustment 44 sets the highlight and shadow points of the signal to predetermined positions, and the thus picture-adjusted signals are inputted to a color correction circuit 35, so that the color signals after the color correction are gradation-converted by a gradation conversion table 46. The gradation-converted signals are then inputted to a K-printer generating circuit 47 which generates a K (black)-printer in addition to C, M and Y-colors, so as to be converted into C,M,Y and K colors. These color signals are inputted to a magnification (enlargement and reduction) adjusting circuit 48 for a magnification conversion and then inputted to a sharpness emphasis circuit 49 which stresses the sharpness, whereby a halftone dot % signals DS is obtained. The above-mentioned END conversion circuirt 43 receives END matrix data which forms a matrix used in the END conversion, while the picture adjustment 44 receives set density values of the highlight and shadow points so that the brightness level curve is set in the picture adjustment 44. On the other hand, the color correction circuit 45 receives color correction coefficients so that parameters for color correction are set in the color correction circuit 45. A gradation curve has been inputted to the gradation conversion table 46. A K-printer curve, a K-printer intensity data and an UCR (Under Color Removal) intensity data have been inputted to the K-printer generating circuit 47. A USM (Unsharp Mask) size intensity data has been inputted to the sharpness emphasis circuit 49.

The input section 30 has a reading mechanism identical with the constructio shown in FIGS. 8A and 9 and further the output section 50 also has an output unit as shown in FIG. 10.

Figure 32:
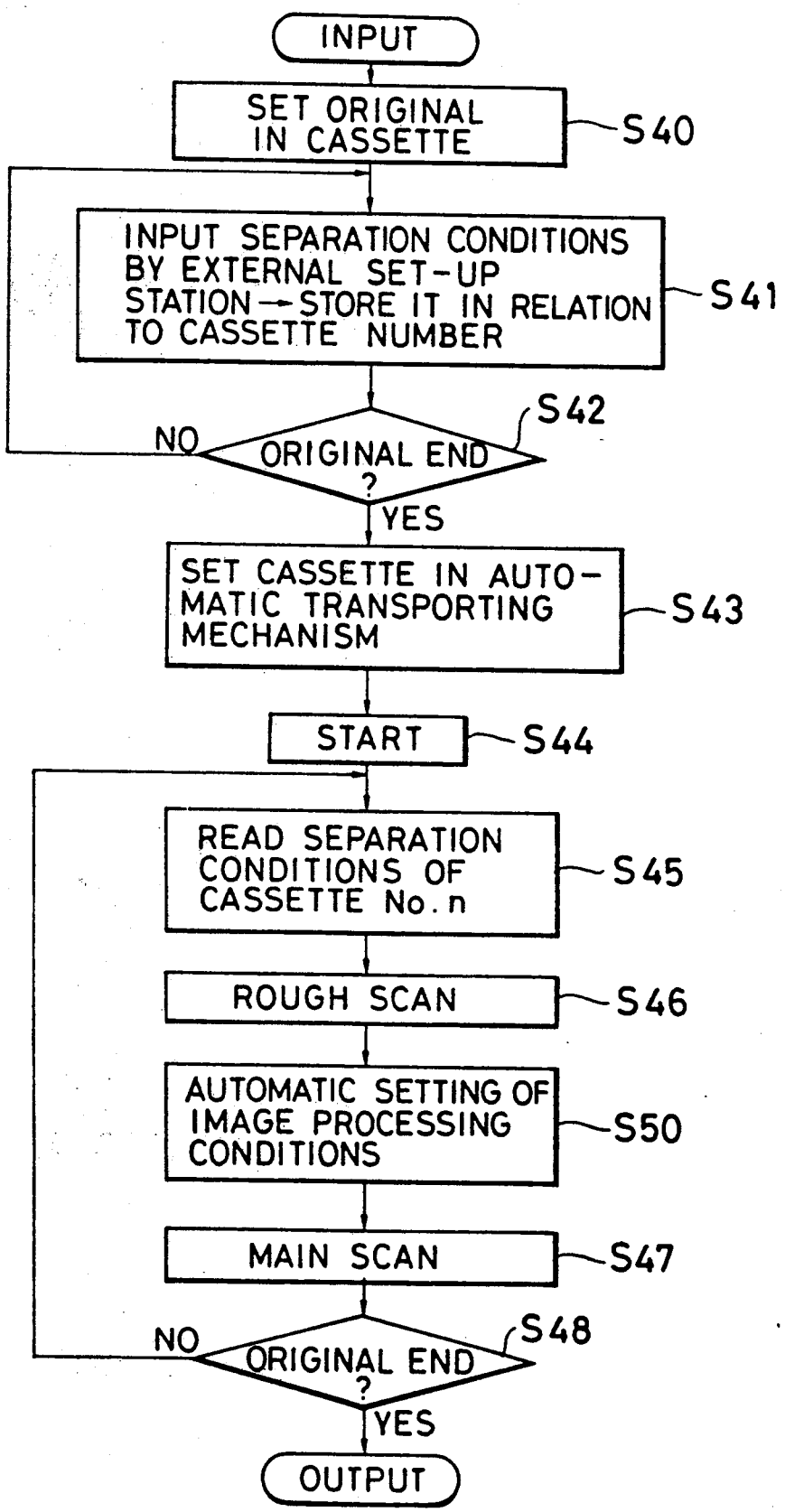
FIGS. 32 and 33 are flow charts to illustrate the operation of the described embodiment, respectively.

The operation of this embodiment will be described with reference to a flow chart shown in FIG. 32.

An original is set in the original cassette 790 (Step S40), and the separation conditions SU such as the magnification, trimming range, negative/positive selection and so forth are inputted to the image processing section 40 from an external set-up station (not shown), the inputted conditions being stored in a memory (not shown) in relation to the cassette numbers (Step S41). The operation for inputting the separation conditions SU is sequentially conducted until the original for all originals (Step S42). Then, the original cassette 790 is set in the storage box 720 of the auto-feeder 712 of the storage and transporting unit 710 shown in FIGS. 25 to 28, in a manner shown in FIG. 26 (Step S43). The image reading operation is then started in response to a start signal which is provided when, for example, a start button is pushed by an operator (Step S44).

A description will be given of the manner in which the original cassette 790 is transported from the auto-feeder 712 of the storage and transportation unit 710 to the color scanner 700. When the desired original is appointed through the operation panel 701, the original cassette 790 containing the original is retrieved. As the motor 735 is driven, the rollers 731 and 732 are rotated so that the screw rods 729 and 730 also are rotated to cause the storage box 720 up and down. In this state, the solenoid 741 has been energized so as to cause the swivel plate 743 in the direction of the arrow P about the pivot point 743A, so that the roller 723 is kept away from the cassette drive window 722 and the driving plate 746 opposite to the roller 723 also is kept away from the storage box 720 so as to allow the storage box 720 to smoothly move up and down. When the storage box 720 has reached a predetermined set position, the motor 735 is stopped and the solenoid is deenergized so that the swivel plate 743 is rotated in the direction of the arrow Q by the force of, for example, spring, so that the roller 723 is pressed onto one side surface of the original cassette 790 through the cassette driving window 722. This in turn causes the other side surface of the original cassette 790 to be pressed against the guide rollers 747 on the driving plate 746. Then, the motor 742 operates in the direction of the arrow S so that the original cassette 790 is moved out of the storage box 720 through the entrance/exit 721 as indicated by the arrow M.

The original cassette 790 thus driven out of the auto-feeder 712 is sent to the feed passage 751 in the input section 30 of the color scanner 700 by means of the cassette transportation mechanism 750 and is fed into the original table 900 while being guided at its both sides by the feed rollers 753 to 755 driven by the motor 758. The original cassette 790 then slides on the moving plate 923 of the original table 900 and advances until it is stopped by the stopper 930 while being guided by the guide rollers 931 to 933 and 934 to 936, and is loaded in the cassette receiving recess 912. Then, the separation conditions SU corresponding to the number $\underline{n}$ of the cassette set in the scanner 700 are read from the memory (Step S45), and the input section 30 conducts a rough-scan (pre-scan) of the original in the original cassette 790 (Step S46). The rough-scan data LS thus obtained is inputted to the automatic condition setting unit 60 through the image processing unit 40, and the following process in executed.

Namely, the signal processing conditions are automatically set in accordance with the result of the pre-scan in a manner which will be described with reference to FIGS. 33 and 14. The image data PD obtained through the rough-scan (Step S51) is stored in the image memory (Step S52) and the image of the original is displayed on a monitor such as a CRT (Step S53). At the same time, characteristic values CR are computed (Step S55). The characteristic values CR included levels of density at any percentage (%) of accumulation of the cumulative histograms for each of the R, G and B colors, the density level at any accumulation percentage of the cumulative histogram in each section, e.g., $\frac{1}{4}$, $\frac{1}{8}$ and so forth, of the screen for each of the colors R, G and B, mean density level for each of the colors R, G and B, and the maximum peak density of the histogram for each of the colors R, G and B. FIG. 15B illustrates an example of the cumulative histogram. The density of the cumulative histogram at any desired percentage (%) is obtained in a manner shown in FIG. 15A. FIG. 15B also shows an example of the histogram. The peak density of the histogram is obtained in a manner shown in FIG. 15B. Original classification informations OC are calculated in accordance with a rule which described the relationship between these characteristic values CR and the original characteristics. For instance, the following items of original classification informations OC (①) to (⑦)) are obtained in accordance with the following rules.

① If the mean density level is very low, then the exposure is extremely over.
② If the mean density level is low, then the exposure is over.
③ If the mean density is slightly low, then the exposure is slightly over.
④ If the mean density level is medium, then the exposure is normal.
⑤ If the mean density level is slightly high, then the exposure is slightly under.
⑥ If the mean density level is high, then the exposure is under.
⑦ If the mean density level is very high, then the exposure is extremely under.

Thus, the mean density level range is divided into seven sections designated at ① to ⑦. Thus, the inputted data falls within one of the above-mentioned regions or rules, so that the exposure condition, i.e., whether the exposure is over or under, is determined. Other items of the original classification informations OC are distinction between high-key and low-key, presence or absence of highligh point, pattern, presence or absence of skin color, color fogging, and so forth. The above-mentioned rules of fuzzy reasoning can be applied to each of such other items. Subsequently, parameter setting operation PO is conducted on the basis of the original classification informations OC, in accordance with the following rules.

If the exposure is extremely over, then the density of highlight point is 0.05.
If the exposure is over, then the density of highlight point is 0.10.
If the exposure is slightly over, then the density of highlight point is 0.15.
If the exposure is normal, then the density of highlight point is 0.20.
If the exposure is slightly under, then the density of highlight point is 0.30.
If the exposure is under, then the density of highlight point is 0.40.
If the exposure is extremely under, then the density of highlight point is 0.50.

Thus, the density level of the highlight point is determined in accordance with these rules. Highlight point densities also are determined from other characteristic values in the same manner as described above, and the mean value of the highlight point densities determined from different characteristic values is computed. It will be understood that the fuzzy reasoning rule of "If ..., then ..." can be applied also to other items.

On the other hand, the operator inputs the trimming area (Step S54) through the operation panel 701 while monitoring the image through the monitor display. Then, the settling of parameters is conducted (Step S56) on the basis of the original classification informations OC obtained in the manner described, followed by setting of the signal processing conditions (Step S57).

Then, main scanning is executed by the input unit 30 (Step S58). The data read through the main scan is inputted to the image processing section 40 and is processed with the parameters which have been set automatically. Examples of the set-up parameters are densities of the highlight and shadow points, shape of the gradation conversion curve, sharpness emphasis coefficients and color correction coefficients.

The halftone dot % signals DS of the colors C, M, Y and K derived from the image processing section 40 are converted in the output section 50 (the image output unit 500) into halftone films. The halftone films output from the output section 50 are delivered to an automatic developing unit 600 so that the color images on the film are developed. The films carrying the developed color images are used as films for making separation of the C, M, Y and K colors.

The original cassettes 790 after the reading of the original image is extracted from the cassette receiving recess 912 in the original table 900 and is conveyed on the moving plate 923 along the arrays of the guide rollers 931 to 933 and 934 to 936, and is fed back to the cassette transportation mechanism 750. The original cassette transported by the cassette transportation mechanism 750 is then moved in the direction of the arrow N through the entrance/exit 721 of the storage box 720 which has been raised to a predetermined position. Then, the motor 742 is reversed so that the original cassette 790 is stored in the storage box 720.

According to the color scanner and the automatic setting method of this invention, the original cassette containing the color original can be used without any troublesome operation of applying the originals, so that the whole operation of the setting method of the color scanner can be done plane scanning, high speed inputting can be attained. Because that the setting of the parameters necessary to the signal processing can be done precisely according to the certainty calculated and the characteristics of the original, it is possible to improve the productivity and workability of the color scanner.

As will be understood from the foregoing description, in the color scanner of this invention, original classification information is obtained from characteristic signals representing characteristics of the image obtained through a rough-scan (pre-scan) performed by the input unit, and the image processing conditions are automatically set in accordance with the thus obtained original classification information. Therefore, set-up of image processing conditions, which hitherto have to be conducted by manual work of the operator, can be conducted automatically so as to improve the efficiency of the scanning process, while ensuring objectivity in data setting operation. Furthermore, the storage and transportation of the original (original cassette) are performed fully automatically thus realizing a high-speed operation of the scanner.

It should be understood that many modifications and adaptations of the invention will become apparent to those skilled in the art and it is intended to encompass such obvious modifications and changes in the scope of the claims appended hereto.

What is claimed is:

1. A color scanner comprising: an image reading means for reading an original stored in an original cassette by carrying out of rough-scanning or main scanning; a signal processing means for signal-processing or main scan data of said original, the main scan data being obtained by said image reading means; an automatic operating setting means or automatically obtaining characteristic values of said original on the basis of rough-scan data obtained by said rough-scanning and automatically setting signal processing conditions, said automatic operating setting means providing fully automated set-up of said signal processing means; an instruction input means for inputting necessary instructive informations to said signal processing means; and a recording means for recording the image on the basis of the output of said signal processing means.

2. A color scanner as claimed in claim 1, wherein fuzzy reasoning is used in a process for setting said signal processing conditions.

3. An automatic setting method of signal processing conditions, in a color scanner for reading an original stored in an original cassette and signal-processing the signal obtained by the reading in order to record the image, comprising the steps of obtaining characteristic values of said original on rough-scan data of said original, automatically calculating original classification informations on the basis of the characteristic values and automatically setting parameters of said signal processing on the basis of the original classification informations in accordance with a fuzzy reasoning process.

4. A color scanner comprising: an image reading means for reading an original stored in an original cassette by carrying out of a rough-scanning or main scanning; a signal processing means for signal-processing main scanning data of said original, the main scanning data being obtained by said image reading means; an operating setting means for obtaining characteristic values of said original on the basis of rough-scan data obtained by said rough-scanning, calculating original classification informations on the basis of the characteristic values, setting signal processing conditions for said signal processing means, and outputting a certainty factor; an instruction input means for inputting necessary instructive information to said signal processing means; an auxiliary input means for inputting necessary auxiliary informations when said certainty factor is low; and a recording means for recording the image on the basis of the outputs of said signal processing means.

5. A color scanner as claimed in claim 4, wherein fuzzy reasoning is used in processes for calculating said original classification informations and for setting said signal processing conditions.

6. An automatic setting method of signal processing conditions, in a color scanner for reading an original stored in an original cassette and signal-processing the signal obtained by the reading in order to record the image, comprising the steps of obtaining characteristic values of said original on rough-scan data of said original, automatically calculating original classification informations on the basis of the characteristics values, determining a certainty factor, automatically setting parameters of said signal processing on the basis of the original classification informations, and inputting necessary supplemental informations when the certainty factor is low.

7. An automatic setting method as claimed in claim 6, wherein fuzzy reasoning is used in processes for calculating said original classification informations and for setting said signal processing conditions.

8. A color scanner comprising: an image reading means for reading an original stored in an original cassette by carrying out of a rough-scanning or main scanning; a signal processing means for signal-processing main scan data of said original, the main scan data being obtained by said image reading means; an automatic operating setting means for automatically obtaining characteristic values of said original on the basis of rough-scan data obtained by said rough-scanning and automatically setting signal processing conditions for said signal processing means, said automatic operating setting means providing full automation of said signal processor setup; a finish input means for inputting finishing informations of the image to the setting of the signal processing conditions and correcting them; an instruction input means for inputting necessary instructive informations to said signal processing means; a recording means for recording the image on the basis of the output of said signal processing means.

9. A color scanner as claimed in claim 8, wherein fuzzy reasoning is used in a process for setting of the signal processing conditions.

10. An automatic setting method of signal processing conditions, in a color scanner for reading an original stored in an original cassette and signal-processing the signal obtained by the reading in order to record the image, comprising the steps of obtaining characteristic values of said original on rough-scan data of said original, automatically calculating original classification informations on the basis of the characteristic values and automatically setting parameters of said signal processing by adding finishing informations to the original classification informations in accordance with a fuzzy reasoning process.

11. A color scanner comprising: an input section for scanning and reading an original while conducting color separation; an original storage and transporting section having an original storage portion, said original storing and transporting section being capable of automatically transporting said original from said storage portion to said input section; image processing section for performing image processing on the basis of color separation signals from said input section so as to produce halftone signals; an output section for producing and outputting a halftone film from said halftone signals; and automatic condition setting section for determining processing conditions on the basis of the rough scan data from said image processing section and for automatically setting set-up parameters of said image processing section in accordance with a fuzzy reasoning process.

12. A color scanner according to claim 11, wherein said automatic condition setting section includes a means for determining characteristic values of said original from rough scan data of said original; a means for computing original classification informations of said original on the basis of said characteristic values; and a means for automatically setting the parameters of the signal processing in accordance with said original classification informations.

* * * * *